US011440786B2

(12) United States Patent
Springer et al.

(10) Patent No.: US 11,440,786 B2
(45) Date of Patent: Sep. 13, 2022

(54) SYSTEMS AND METHODS FOR DISPENSING FLUID MIXTURES

(71) Applicant: Cana Technology, Inc., Redwood City, CA (US)

(72) Inventors: Gregory Allen Springer, Los Altos, CA (US); Jeffery Lance Kizer, Oakland, CA (US); Matthew Ambauen, San Francisco, CA (US); Stephan Weidi Tai, San Francisco, CA (US); Erik James Shahoian, Sonoma, CA (US); David Friedberg, San Francisco, CA (US); Andrés Ornelas Vargas, San Francisco, CA (US); Simon Spence, Hawthorn (AU); Peter Delmenico, Hampton (AU); Andrew Christopher Jenkins, West Heidelberg (AU); Nathan Andrew Ray, Heathmont (AU)

(73) Assignee: Cana Technology, Inc., Redwood City, CA (US)

( * ) Notice: Subject to any disclaimer, the term of this patent is extended or adjusted under 35 U.S.C. 154(b) by 0 days.

(21) Appl. No.: 17/545,433

(22) Filed: Dec. 8, 2021

(65) Prior Publication Data

US 2022/0250890 A1    Aug. 11, 2022

Related U.S. Application Data

(60) Provisional application No. 63/146,461, filed on Feb. 5, 2021.

(51) Int. Cl.
*B67D 1/00* (2006.01)
(52) U.S. Cl.
CPC ......... *B67D 1/0052* (2013.01); *B67D 1/0019* (2013.01)

(58) Field of Classification Search
CPC .. B67D 1/0052; B67D 1/0019; B67D 1/0046; B67D 1/1218; B67D 1/1234;
(Continued)

(56) References Cited

U.S. PATENT DOCUMENTS 4,121,507 A * 10/1978 Kuckens .............. B67D 1/0046
99/275
4,665,809 A *  5/1987 Aschberger ....... B01F 35/71805
426/477
(Continued)

FOREIGN PATENT DOCUMENTS

WO    2009012013 A1    1/2009
WO    2019121554 A1    6/2019
(Continued)

OTHER PUBLICATIONS

International Search Report dated May 18, 2022 from International Application No. PCT/US2022/012359 filed Jan. 13, 2022, 14 pages.

*Primary Examiner* — Charles P. Cheyney
(74) *Attorney, Agent, or Firm* — Daylight Law, P.C.

(57) ABSTRACT

In some embodiments of a fluid dispensing system: (1) two or more mixing channels are fluidly connected to (a) a mixing chamber fluidly connected to a dispenser, (b) a particular two or more solvent reservoirs, and (c) a respective one or more ingredient reservoirs, wherein each of the ingredient reservoirs is configured to dispense into a respective one of the mixing channels; and (2) a controller is programmed to receive a request for a fluid mixture, and, in response control the system to: mix, in the mixing channels to form an intermediate fluid mixture, a respective predetermined amount of solvent from each of the particular solvent reservoirs and a respective predetermined amount of the ingredients from some of the ingredient reservoirs; flow, to the mixing chamber and then to the dispenser, the (Continued)

intermediate fluid mixture; and dispense the requested fluid mixture (including the intermediate fluid mixture) via the dispenser.

36 Claims, 19 Drawing Sheets

(58) Field of Classification Search
CPC .. B67D 1/0037; B67D 1/1285; B67D 1/0021; B67D 1/0041; B67D 1/0888; B67D 1/07
USPC .......................... 222/129.1, 129.4, 145.6, 1
See application file for complete search history.

(56) References Cited

U.S. PATENT DOCUMENTS

| | | | |
|---|---|---|---|
| 5,292,030 A * | 3/1994 | Kateman | A23G 9/228 261/78.2 |
| 5,806,550 A * | 9/1998 | Frank | B67D 1/1222 137/7 |
| 6,592,098 B2 | 7/2003 | Kao et al. | |
| 6,669,053 B1 * | 12/2003 | Garson | G07F 13/065 222/61 |
| 6,766,656 B1 | 7/2004 | Crisp, III et al. | |
| 7,866,509 B2 * | 1/2011 | Ziesel | B67D 1/0081 222/145.5 |
| 8,181,822 B2 | 5/2012 | Doelman et al. | |
| 8,584,900 B2 | 11/2013 | Metropulos et al. | |
| 8,788,090 B2 | 7/2014 | Rothschild | |
| 9,731,266 B2 | 8/2017 | Stem et al. | |
| 10,501,304 B2 | 12/2019 | Jangbarwala et al. | |
| 10,730,735 B2 * | 8/2020 | Cook | B67D 1/0035 |
| 11,208,314 B2 * | 12/2021 | Peirsman | C12C 11/11 |
| 2006/0138170 A1 | 6/2006 | Brim et al. | |
| 2007/0205220 A1 * | 9/2007 | Rudick | B67D 1/07 222/145.6 |
| 2007/0257059 A1 * | 11/2007 | Stevenson | B67D 1/0021 222/145.6 |
| 2008/0049548 A1 * | 2/2008 | Kadyk | B01F 33/81 366/177.1 |
| 2008/0148959 A1 * | 6/2008 | Bockbrader | A47J 31/402 99/323.3 |
| 2015/0210522 A1 * | 7/2015 | Jersey | B67D 1/0044 222/134 |
| 2016/0318746 A1 * | 11/2016 | Peirsman | B67D 1/0021 |
| 2017/0225936 A1 | 8/2017 | Jersey et al. | |
| 2018/0362318 A1 * | 12/2018 | Rasmussen | B67D 1/1204 |
| 2019/0053658 A1 * | 2/2019 | Lecomte | B67D 1/1284 |
| 2019/0070643 A1 | 3/2019 | Wong et al. | |
| 2019/0330043 A1 * | 10/2019 | Carpenter | B67D 1/122 |
| 2020/0087132 A1 | 3/2020 | Moore et al. | |

FOREIGN PATENT DOCUMENTS

| | | |
|---|---|---|
| WO | 2020047612 A1 | 3/2020 |
| WO | 2020219385 A1 | 10/2020 |

* cited by examiner

102 Receive a request for a fluid mixture

104
Flow predetermined amount of solvent from a solvent reservoir to a mixing channel and a mixing chamber and/or dissolution chamber Flow predetermined amount of at least one ingredient from a plurality of ingredient reservoirs to the at least one mixing channel and/or the dissolution chamber to form an intermediate fluid mixture(s)

Flow intermediate fluid mixture(s) to the mixing chamber

106 Dispense the fluid mixture from the mixing chamber via a dispener

SYSTEMS AND METHODS FOR DISPENSING FLUID MIXTURES

CROSS REFERENCE TO RELATED APPLICATIONS

This application claims the benefit of U.S. Provisional Patent Application No. 63/146,461 filed Feb. 5, 2021, which is incorporated by reference herein in its entirety for all purposes.

BACKGROUND

Typical beverage dispensing systems combine a diluent (e.g., water) with a basic beverage component such as concentrates or syrups made up of a multitude of other ingredients. However, these basic beverage components often require significant storage space and may even need to be kept refrigerated to protect against spoilage. Accordingly, these basic beverage components are often not stored in the beverage dispensing system, or even in the same room as the system. In addition, each individual beverage may require its own unique basic beverage component thereby further increasing storage space requirements and the overall footprint of the beverage dispensing system. Furthermore, typical beverage dispensing systems do not generally allow for high levels of flavor customization for an end user because the users are, in many cases, limited to flavor combinations that are preordained by others such as the manufacturers of the concentrates or syrups mentioned above or the manufacturers of the beverage dispensing systems themselves.

SUMMARY

According to various embodiments, fluid mixture dispensing is accomplished by an automated fluid mixture dispensing system. The system generates mixtures of beverages, cleaning products, cosmetic compounds, and/or various other fluid mixtures. Based on a user selection that is optionally custom tailored by the user, the system is configured to prepare and dispense a variety of fluid mixtures based on a set of basic solvents and ingredients. The system is able to rely on a predefined chemical makeup of the fluid mixture in order for the system to prepare the fluid mixture. For example, chemical analysis of a specific wine or perfume results in a list of chemical ingredients or components that make up the specific wine or perfume. The systems disclosed herein are able to rely on such a predetermined list of chemical ingredients for a user-specified fluid mixture (e.g., chardonnay) to prepare that fluid mixture. Some chemical ingredients may be dispensed in the final mixture with relatively large volume percentages (e.g., a glass of wine may have about 10-15% ethanol), whereas other components may be dispensed in a volume of less than 0.1 mL.

Accordingly, rather than forming a fluid mixture solely from concentrates or syrups, the systems disclosed herein are configured to form the fluid mixture based on predetermined amounts of individual chemical ingredients that make up the fluid mixture, allowing for a level of customization and choice not available to current beverage systems. In some embodiments, because a small quantity (e.g., less than 0.1 mL) of an individual chemical ingredient can have a large effect on a fluid mixture property (e.g., taste), the overall storage or footprint of the system is significantly smaller than those dispensing system that rely on syrups and/or concentrates.

According to various embodiments, a particular one of the systems disclosed herein comprises a plurality of ingredient reservoirs containing respective ingredients and a combination of zero or more of each of the following components: a cartridge (also called an ingredient cartridge), optionally and/or selectively pressurizable, to contain the plurality of ingredient reservoirs; a solvent reservoir containing a respective solvent (e.g., a diluent); a solvent inlet, such as a water inlet to connect to an exterior water supply; a mixing channel; a dissolution chamber; a mixing chamber; a dispenser (e.g., a nozzle); a drip tray (e.g., waste storage); a carbonator; a heat exchanger; a pneumatic system; a pump, such as a motor-operated or a pressure-operated pump; a microfluidic pump; a fluid mixture holder sensor (to monitor whether or not a receptacle for the fluid mixture is present); a drip tray sensor (to monitor whether or not the drip tray is present and/or an amount of fluid in the drip tray); a dispensing sensor (to monitor a dispensing profile of the fluid mixture); a valve, such as an electromechanical valve; interconnection hardware such as pipes and/or tubing; a temperature sensor; a pressure sensor; a flow sensor; a user interface, such as a control panel; a controller, such as a microprocessor; and any other device, sensor, or equipment used in fluid dispensing systems.

In some embodiments, one or more sources (e.g., the ingredient reservoirs and/or the solvent reservoirs) are fluidly connected to one or more collection points in a fluid path (a flow) from the one or more sources to the dispenser. The collection points include one or more mixing channels, mixing chambers, dissolution chambers, and, in various embodiments, the dispenser. A number and a type of the collection points in a particular system is a function of the use (e.g., environment) of the system, and/or the types of solvents and the types of ingredients required to produce desired fluid mixtures. For example, a beverage dispensing system is configured with a different set of components including different collection points and/or a different arrangement of collection points as compared to a cleaning fluid dispensing system.

In some embodiments, a flow of a solvent from a solvent reservoir is optionally and/or selectively heated and/or cooled by a heat exchanger as it flows to a next collection point. (For example, the flow of the solvent is through serpentine tubing embedded in the heat exchanger.) In further embodiments, one heat exchanger is configured to heat and/or cool two or more flows of solvents. In various embodiments, any of the collection points is optionally and/or selectively heated and/or cooled by a heat exchanger. In specific embodiments, one or more temperature sensors are used before and/or after a heat exchanger, such as to measure temperature of one or more input flows to the heat exchanger or temperature of an output flow from the heat exchanger. In various embodiments, temperature sensors are used in other parts of the system, such as to measure a temperature of a solvent in a solvent reservoir, a temperature of a solvent from a solvent inlet, or a temperature of a fluid or a gas at any point in the system (e.g., fluid at the dispenser or gas in the cartridge).

In some embodiments, the controller is programmed to monitor any of the sensors (e.g., pressure sensors, temperature sensors, fluid mixture holder sensors, drip tray sensors, or dispensing sensors) in real time, and is able to control any of the controllable components (e.g., valves, pumps, microfluidic pumps, pneumatic systems, or heat exchangers). By monitoring the sensors and controlling the controllable components, the controller is programmed to prepare one of a plurality of fluid mixtures according to a respective formula (also called a recipe herein) using the ingredients and the solvents. The controller is further programmed to produce a series of fluid mixtures of different types using the respective formulas, for example a glass of wine followed by a Manhattan cocktail. A formula specifies things such as: an amount of one or more ingredients to be used; an amount of one or more solvents to be used; a sequence of operations, such as order in which ingredients and/or solvents are dispensed, or an order in which pumps and/or valves are activated; heating and/or cooling instructions for one or more flows and/or collection points; carbonation requirements, such as whether a flow of water passes through a carbonator or an amount of carbonated water to add; pre-dispense or post-dispense flushing instructions; other techniques for producing fluid mixtures; and any combination of the foregoing. In some embodiments and/or usage scenarios, the controller is programmed to purge (flush) the system, such as by dispensing an amount of a particular solvent to flow through the system into the drip tray, in between producing fluid mixtures of different types. In some embodiments, the system is able to produce a fluid mixture up to one liter in volume. In other embodiments, the system is able to produce a fluid mixture up to three liters in volume. In industrial applications, the system is able to produce a fluid mixture of hundreds or thousands of liters in volume.

In various embodiments, the controller has access to and/or contains a library of predefined recipes. According to various embodiments, the controller produces a particular fluid mixture one or more of: in response to a request, such as via a user interface (e.g., a control panel); in response to commands received over a network, such as from a computer or a smart phone; automatically; according to a programmed schedule; other techniques for controlling production of fluid mixtures at desired times and/or places; and any combination of the foregoing. In further embodiments, the recipes are customizable, such as via a user at a user interface, or in response to commands received over a network, such as from a computer or a smart phone; to modify a particular recipe for a user's specific requirements. For example, a user selects a recipe for a Manhattan cocktail, but changes an amount of bitters to be used from a default amount. Another embodiment adjusts the amount of an ingredient in a recipe based on changes to the default recipe which are pushed to the device via an "Over The Air" update by the controller of the default recipes library.

In various embodiments with a fluid mixture holder sensor, the controller is programmed to only dispense the fluid mixture when a fluid mixture holder (e.g., a cup or other receptacle beneath the dispenser) is detected by the fluid mixture holder sensor. For example, the controller does not start producing a fluid mixture unless the fluid mixture holder sensor detects a receptacle beneath the dispenser. In another embodiment, the device does not start the beverage mixing process unless the fluid mixture holder sensor detects a receptacle beneath the dispenser.

In various embodiments with a drip tray sensor, the controller is programmed to determine whether the drip tray is present and/or an amount of fluid in the drip tray. In further embodiments, the controller is programmed to not dispense the fluid mixture if the drip tray is not present and/or the amount of fluid in the drip tray is more than a threshold.

In various embodiments with a dispensing sensor, the controller is programmed to determine whether the fluid mixture to be dispensed or being dispensed has a satisfactory dispensing profile. For example, the dispensing sensor is configured to determine one or more of the flow rate, the viscosity, the carbonation level, the sweetness (e.g., the sugar content), or the alcoholic content of the fluid mixture.

In some embodiments with a flow sensor, the controller is programmed to determine whether a flow of a fluid at a point in the system is as expected (e.g., measuring the flow rate) and/or to determine a volume of the fluid passing the point in the system (e.g., measuring an amount of the fluid).

In some embodiments with a pressure sensor, the controller is programmed to determine whether a pressure in a container, such as in a pressurized cartridge, is at a desired level, and/or to monitor a change in the pressure in the container over time.

In various embodiments, the controller is programmed to detect (such as with a sensor) or determine (such as by accumulating dispensed amounts vs. an initial volume) whether a particular ingredient reservoir or a particular solvent reservoir has less than a respective threshold amount of its contents remaining. For example, the controller is programmed to determine after dispensing a number of fluid mixtures that a particular one of a plurality of solvent reservoirs is nearly empty.

In some embodiments, the ingredient reservoirs contain ingredients, such as a solid (including crystalline, powdered, or other forms of a solid), a liquid, or a gas, used in the preparation of a fluid mixture. Similarly, the solvent reservoirs contain solvents, such as a liquid or a gas, used in the preparation of a fluid mixture. In general, but not in all embodiments and/or usage scenarios, ingredients reservoirs have a lower volume than solvent reservoirs, and/or ingredients are used in fluid mixtures in lower amounts than solvents. Examples of ingredients include flavorings, syrups, and chemicals such as citric acid (in solid form or in a solution). Examples of solvents include alcohol (e.g., ethanol or isopropanol), water, ethyl lactate, and propylene glycol. In specific embodiments, there are at least three ingredient reservoirs. In further embodiments, there are a dozen or more ingredient reservoirs. A typical system has two or more solvent reservoirs, but some systems have only one solvent reservoir, and other systems might not have any solvent reservoirs. For example, a non-alcoholic, diet beverage producing system with a carbonator requires only a water reservoir, or alternatively a water inlet (with no water reservoir required). In specific embodiments, at least some of the solvent reservoirs are replaceable and/or refillable (e.g., when an amount of solvent in the solvent reservoir is below a threshold).

According to various embodiments, an amount of a particular ingredient dispensed into a fluid mixture varies from fractions of a milliliter (e.g., 0.01 mL or less) to multiple liters (e.g., three liters). (Of course, for solid or gaseous ingredients, equivalent variations in a range of the amount dispensed apply.) An amount of a particular solvent used in a fluid mixture varies similarly. For example, a glass of wine has a 10% alcohol content, whereas a Manhattan cocktail has a 34% alcohol content.

In some embodiments, a plurality of ingredient reservoirs is contained in a cartridge. In further embodiments, there are multiple of such cartridges, such as with different sets of ingredient reservoirs, as spare/backup cartridges, and/or in systems with multiple dispensers. According to various embodiments, each of the ingredient reservoirs is of one or more types, such as: a bladder bag; a syringe; a gravity dispense chamber; a pellet dispenser; a pierceable volume; and any other container used for a solid (including crystalline, powdered, or other forms of a solid), a liquid, or a gas. In various embodiments, all of the ingredient reservoirs in a cartridge are of a same type. In other embodiments, a cartridge contains ingredient reservoirs of two or more types. According to various embodiments, each of the ingredient reservoirs is of one or more sizes, such as: a small size (e.g., one ounce or less, or two ounces or less); a medium size (e.g., four ounces or less, or eight ounces or less; a large size (e.g., 16 ounces or less, or 32 ounces or less); and other sizes or gradations as used in differing usage scenarios. In various embodiments, all of the ingredient reservoirs in a cartridge are of a same size. In other embodiments, a cartridge contains ingredient reservoirs of two or more sizes. In various embodiments, a cartridge (and the ingredient reservoirs it contains) is a replaceable unit.

In some embodiments, the system is configured to dispense a predetermined amount of one or more ingredients from the ingredient reservoirs in a cartridge into one or more mixing channels. In various embodiments, the one or more mixing channels are embedded in and/or are part of the cartridge. In a first example, the ingredients are dispensed by individually controlled microfluidic pumps. In a second example, the cartridge is sealed (or contains a sealed interior chamber) and the ingredients are dispensed, at least in part, by pressurizing the cartridge (or the interior chamber) and controlling respective valves of each ingredient reservoir to select which of the ingredient reservoirs is enabled to dispense. The controller is programmed to dispense a given amount of each selected ingredient as a function of, by controlling, and/or by monitoring one or more of: the pressure (applied to all of the ingredient reservoirs in the cartridge); a temperature, such as a temperature in the cartridge (or in the interior chamber); a duration of time and/or a degree to which the respective valve of the ingredient reservoir of the selected ingredient is open; a viscosity of the selected ingredient; a size of a respective orifice from which the selected ingredient is dispensed; and other factors affecting dispensed amounts of the selected ingredient.

In some embodiments, a dissolution chamber is used to more fully combine particular solvents and/or particular ingredients, such as by using heating (with a heat exchanger) or agitation (e.g., a mechanical agitator).

In some embodiments, a solvent, such as water, flows through a carbonator on a fluid path to a collection point.

According to various embodiments, any particular flow of solvents, ingredients, and/or a mixture thereof is moved (e.g., propelled) by one or more of: pressure, such as pneumatic pressure; a pump; a microfluidic pump; gravity; and any other technique used in fluid dispensing systems. Further, the particular flow of solvents is optionally and/or selectively controlled at one or more points by fluid control components such as valves (e.g., electromechanical valves such as solenoid valves or other actuator-driven valves, one-way valves, two-way valves, check valves, ball valves, or butterfly valves) and other types of fluid control or fluid routing mechanisms used in fluid dispensing systems.

In a first example system, a plurality of ingredient reservoirs is contained in a pressurizable cartridge. To make a particular fluid mixture, selected ones of the ingredients from the ingredient reservoirs are dispensed, using pressure applied to the cartridge, into a mixing channel. A solvent from a solvent reservoir also flows through the mixing channel, creating an intermediate fluid mixture. The intermediate fluid mixture and one or more other solvents (optionally and/or selectively heated, cooled, and/or carbonated) are combined in a mixing chamber and dispensed via a dispenser.

A second example system is similar to the first example system but uses two cascaded mixing chambers, a first mixing chamber receiving the intermediate fluid mixture and some of the one or more solvents, and a second (final) mixing chamber receiving the output of the first mixing chamber and another one of the one or more other solvents. This allows particular ones of the one or more other solvents to be mixed in only at the last collection point, e.g., to reduce contamination and/or to minimize a loss of carbonation.

In some embodiments, the ingredients in the ingredient reservoirs comprise at least one selected from the group consisting of glycerine (glycerol), fructose, glucose, lactic acid, malic acid, tartaric acid, potassium phosphate tribasic, sucrose, potassium sulfate, succinic acid, acetic acid, citric acid, tricalcium phosphate, magnesium hydroxide, 3-methylbutan-1-ol, sodium phosphate dibasic, propanol, starter distillate 9x, ethyl acetate, 2-methylbutan-1-ol, 2-methylpropan-1-ol, 2-phenylethanol, oxolan-2-one, iron sulfate heptahydrate, octanoic acid, hexanoic acid, 3-methylbutyl acetate, decanoic acid, hexan-1-ol, ethyl octanoate, furan-2-ylmethanol, ethyl hexanoate, 2-methylpropanoic acid, furan-2-carbaldehyde, ethyl butanoate, 2,6-dimethoxyphenol, ethyl decanoate, hexyl acetate, 2-phenyl ethyl acetate, 3-methylsulfanylpropan-1-ol, ethyl propionate, butan-1-ol, 4-hydroxy-3-methoxybenzaldehyde, 5-methylfuran-2-carbaldehyde, isobutyl acetate, 5-pentyloxolan-2-one, ethyl 2-methylpropanoate, 5-butyl-4-methyloxolan-2-one, 2-methoxy-4-methylphenol, 2-methoxy-4-prop-2-enylphenol, 2-methyoxyphenol, and/or coloring agents.

It will be appreciated that any of the variations, embodiments, features and options described in view of systems disclosed herein apply equally to methods disclosed herein and vice versa. It will also be clear that any one or more of the above variations, embodiments, features and options can be combined.

Additional advantages will be readily apparent to those skilled in the art from the following detailed description. The embodiments and descriptions herein are to be regarded as illustrative in nature and not restrictive.

All publications, including patent documents, scientific articles and databases, referred to in this application are incorporated by reference in their entirety for all purposes to the same extent as if each individual publication were individually incorporated by reference. If a definition set forth herein is contrary to or otherwise inconsistent with a definition set forth in the patents, applications, published applications and other publications that are herein incorporated by reference, the definition set forth herein prevails over the definition that is incorporated herein by reference.

BRIEF DESCRIPTION OF THE DRAWINGS

The invention will now be described, by way of example only, with reference to the accompanying drawings, in which:

FIG. 1 illustrates a flowchart representing an exemplary method of dispensing a beverage, in accordance with some embodiments.

In FIG. 10, a "TCS" is a temperature-controlled storage capable of keeping stored contents at a desired temperature using a heat exchanger. A metering control element, as illustrated in FIG. 10, includes at least one of a valve, an electromotive element, a pump, a pressure sensor, a temperature sensor, a flow sensor, and a mechanical component (e.g., a tee, check valve, etc.).

In FIG. 11, a "TCS" is a temperature-controlled storage capable of keeping stored contents at a desired temperature using a heat exchanger. A metering control element, as illustrated in FIG. 11, includes at least one of a valve, an electromotive element, a pump, a pressure sensor, a temperature sensor, a flow sensor, and a mechanical component (e.g., a tee, check valve, etc.).

In the figures, like reference numbers correspond to like components unless otherwise stated.

DETAILED DESCRIPTION

Figure 2A:
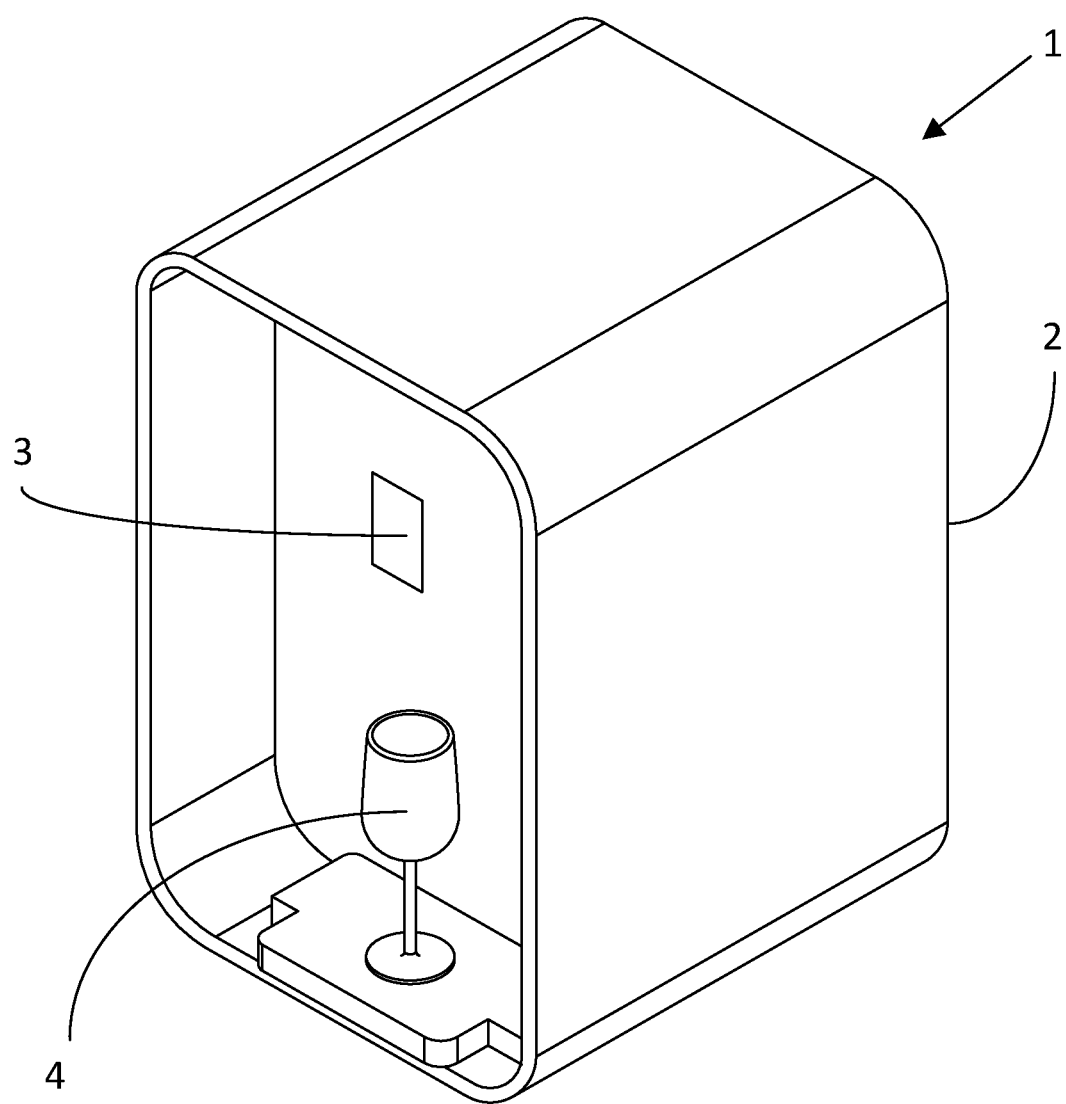
FIG. 2A illustrates an example of a fluid mixture dispensing system, in accordance with some embodiments.

A detailed description of one or more embodiments of the invention is provided below along with accompanying figures illustrating selected details of the invention. The invention is described in connection with the embodiments. The embodiments in the present disclosure are understood to be examples, the invention is expressly not limited to or by any or all of the embodiments in the present disclosure, and the invention encompasses numerous combinations, alternatives, modifications, and equivalents. To avoid monotony in the exposition, a variety of word labels (such as: first, last, certain, various, further, given, other, particular, select, some, specific, and notable) may be applied to separate sets of embodiments; as used in the present disclosure such labels are expressly not meant to convey quality, or any form of preference or prejudice, but merely to conveniently distinguish among the separate sets. The order of some operations of disclosed processes is alterable within the scope of the invention. Wherever multiple embodiments serve to describe variations in process, system, and/or program instruction features, other embodiments are contemplated that, in accordance with a predetermined or a dynamically determined criterion, perform static and/or dynamic selection of one of multiple modes of operation corresponding respectively to one or more of the multiple embodiments. Numerous specific details are set forth in the following description to provide a thorough understanding of the invention. In various embodiments, different numerical values may be used. The details are provided for the purpose of example and the invention may be practiced according to the claims without some or all of the details. For the purpose of clarity, technical material that is known in the technical fields related to the invention has not been described in detail so that the invention is not unnecessarily obscured.

Described herein are fluid mixture dispensing systems and methods. The fluid mixtures described herein can be prepared from a combination of liquids, solids, and gases. According to some embodiments, a fluid mixture dispensing system includes a combination of one or more of at least some of each of the following: a solvent reservoir (e.g., a water reservoir and/or an alcohol reservoir); a dissolution chamber; a plurality of ingredient reservoirs; a mixing channel; a mixing chamber; a dispenser (e.g., a nozzle); a heat exchanger; and a controller. In some embodiments, the controller is configured to receive a request for a fluid mixture and, in response to receiving the request for the fluid mixture, the controller is configured to: (1) flow a predetermined amount of at least one solvent from at least one solvent reservoir (e.g., a predetermined amount of water from the water reservoir and/or a predetermined amount of alcohol from the alcohol reservoir) and a predetermined amount of at least one ingredient from the plurality of ingredient reservoirs to at least one mixing channel to form an intermediate fluid mixture; (2) flow a predetermined amount of at least one solvent from at least one solvent reservoir (e.g., water from a water reservoir and/or alcohol from an alcohol reservoir) to a first mixing chamber; (3) flow a predetermined amount of at least one solvent from at least one solvent reservoir (e.g., a predetermined amount of water from a water reservoir and/or flow a predetermined amount of alcohol from an alcohol reservoir) and flow a predetermined amount of at least one ingredient from at least one ingredient reservoir to at least one dissolution chamber to form an intermediate fluid mixture; (4) flow a predetermined amount of at least one ingredient from at least one ingredient reservoir to a second mixing chamber; and (5) flow contents of the first mixing chamber (if it is not the same as a final mixing chamber), contents of the second mixing chamber (if it is not the same as the final mixing chamber), and the intermediate fluid mixtures, if any, to the final mixing chamber. The system is able to dispense the fluid mixture (e.g., from the final mixing chamber) via the dispenser. Accordingly, the system is able to make numerous different fluid mixtures based on respective requests for the fluid mixtures. Once a request is received for a fluid mixture, the system is configured to automatically create and dispense the fluid mixture by flowing required amounts of solvents (e.g., water and/or alcohol) and/or ingredients from their respective reservoirs to the final mixing chamber, and then dispensing the fluid mixture via the dispenser. In some embodiments, the system only has a single mixing chamber, which can be called a "final" mixing chamber. In various embodiments with multiple mixing chambers, there is generally a last (final) mixing chamber prior, in a sequence of fluid flow, to the dispenser. In other embodiments, the dispenser acts as the final mixing chamber.

The fluid mixture dispensing systems described herein are able to dispense all kinds of fluid mixtures. For example, fluid mixtures include, but are not limited to, beverages (e.g., wine, soda, tea, etc.), cosmetics (e.g., perfumes, makeup, etc.), cleaning products (e.g., shampoo, conditioner, soaps, etc.), inks, oils, and a wide variety of other fluid mixtures.

Figure 9:
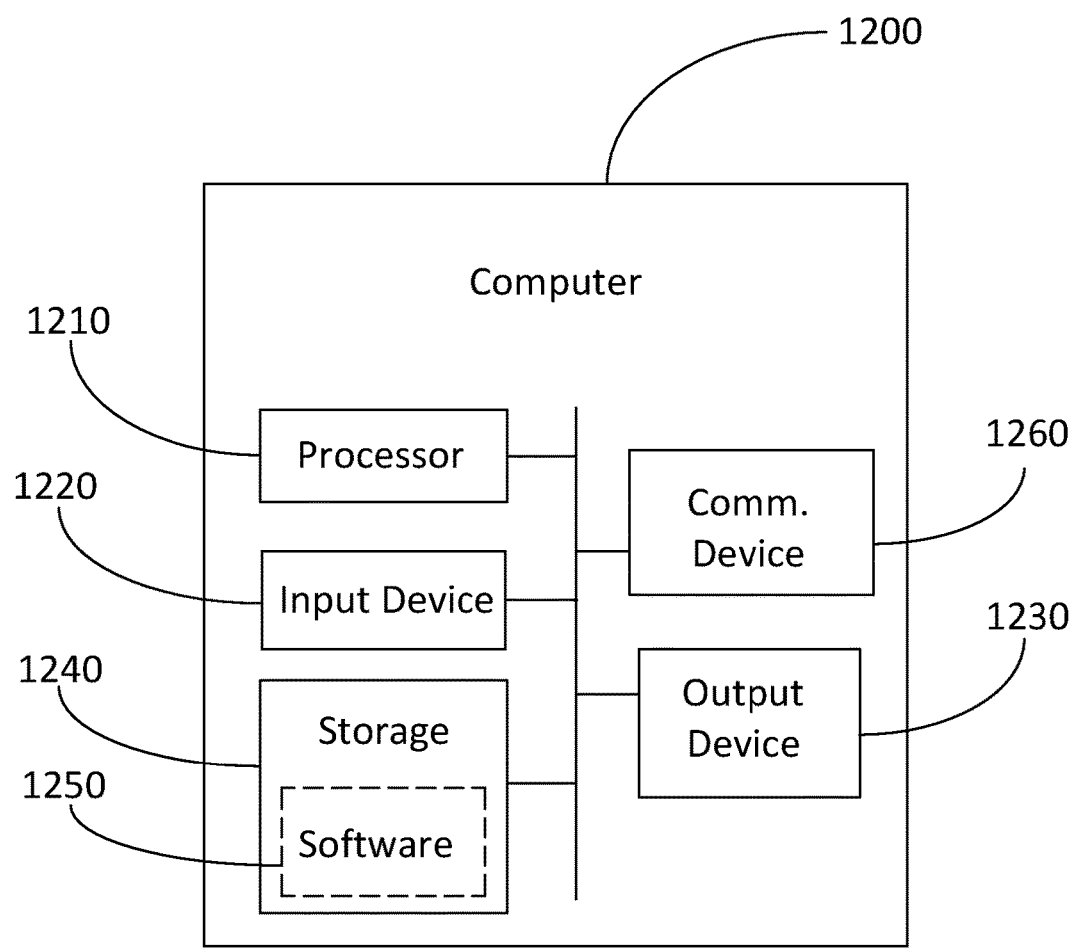
FIG. 9 illustrates a computer, in accordance with some embodiments.

In some embodiments, the system includes a controller. The word "controller" encompasses one or more controllers (e.g., one or more processors, microprocessors, microcontrollers, embedded control processors, and/or CPUs). In specific embodiments of the invention, the controller can be a control system for the overall device even if the various control elements are separately programmed and are not part of a common control hierarchy. In various embodiments, the controller is any device or system comprising one or more computer processors configured to receive user requests, process each of the received requests, and to generate and transmit one or more output signals in accordance with results of the request processing. In some embodiments, the controller is provided, in whole or in part, as all or part of a desktop computing device, laptop, tablet, mobile electronic device, dedicated processing device, computing module, processor, server, cloud computing system, distributed computing system, or the like. In some embodiments, the controller is provided locally with respect to the rest of the fluid mixture dispensing system (e.g., in or attached to the fluid mixture dispensing system), while in other embodiments, the controller is provided remotely from the fluid mixture dispensing system (e.g., outside and not attached to the fluid mixture dispensing system, such as at a remote server location). FIG. 9 illustrates an example of a controller that is able to be used with and/or in the fluid mixture dispensing systems disclosed herein. As previously described, any of the systems optionally includes more than one controller. For example, in some embodiments, a first controller is programmed to operate a user interface and to communicate with other controllers in the system, and a second controller is programmed to operate a fluid control system (e.g., pumps, valves, and/or corresponding sensors).

In some embodiments, the controller is configured to receive user requests, to process the user requests, and to prepare respective fluid mixtures for dispensing. In some embodiments, the controller is configured to dispense a fluid mixture (e.g., a beverage) in accordance with the techniques described herein, such as with reference to FIG. 1.

In some embodiments, the controller is configured to send one or more instructions and/or control signals to various other components of the fluid mixture dispensing system to cause the system to dispense a fluid mixture. In some embodiments, the instructions and/or control signals are sent by the controller in response to a received request for a fluid mixture, and according to a recipe for the requested fluid mixture. References herein to the system receiving a request, performing an action (such as flowing a solvent), etc., include a component of the system, such as the controller, a valve, and/or a pump, controlling, being programmed to control, monitoring, performing, or otherwise enabling at least a part of the receiving the request, the performing the action, etc. In a first example, the system controlling/monitoring (or being configured to control/monitor) an operation refers to the controller of the system controlling/monitoring (or being configured to control/monitor) the operation. In a second example, the system flowing a solvent refers to pumps and/or valves of the system (as controlled by the controller) causing the solvent to flow.

Figure 13:
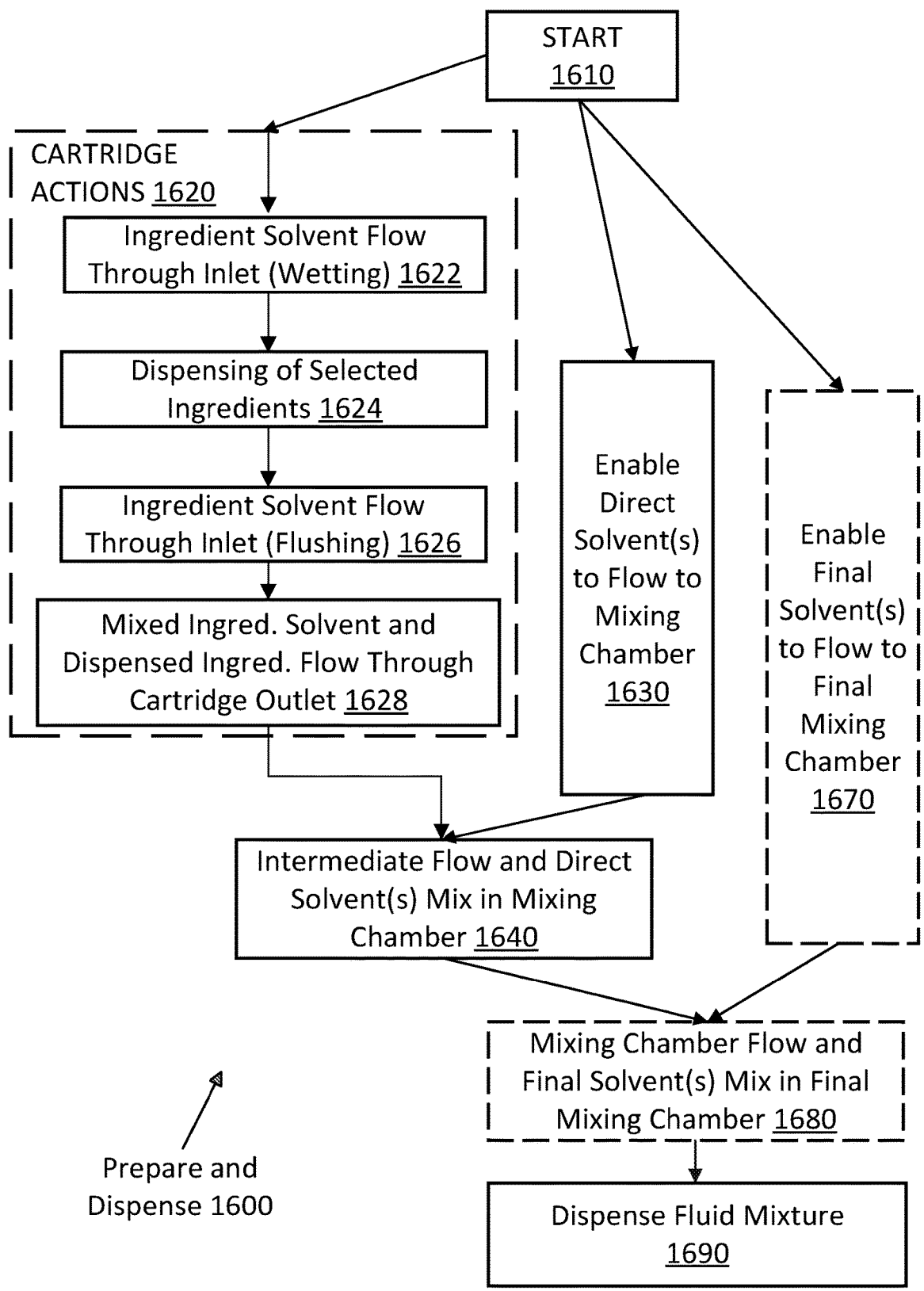
FIG. 13 illustrates a flowchart representing an exemplary method of preparing and dispensing a fluid mixture in accordance with some embodiments.

FIG. 1 illustrates a flowchart representing an exemplary method 100 for dispensing a fluid mixture (e.g., a beverage), in accordance with various embodiments. In some embodiments, any one or more variations of method 100 (and/or of method 1600 as illustrated in FIG. 13) are optionally and/or selectively combined, in whole or in part, with any one or more of the systems, methods, devices, components, and/or techniques described elsewhere herein.

Figure 2B:
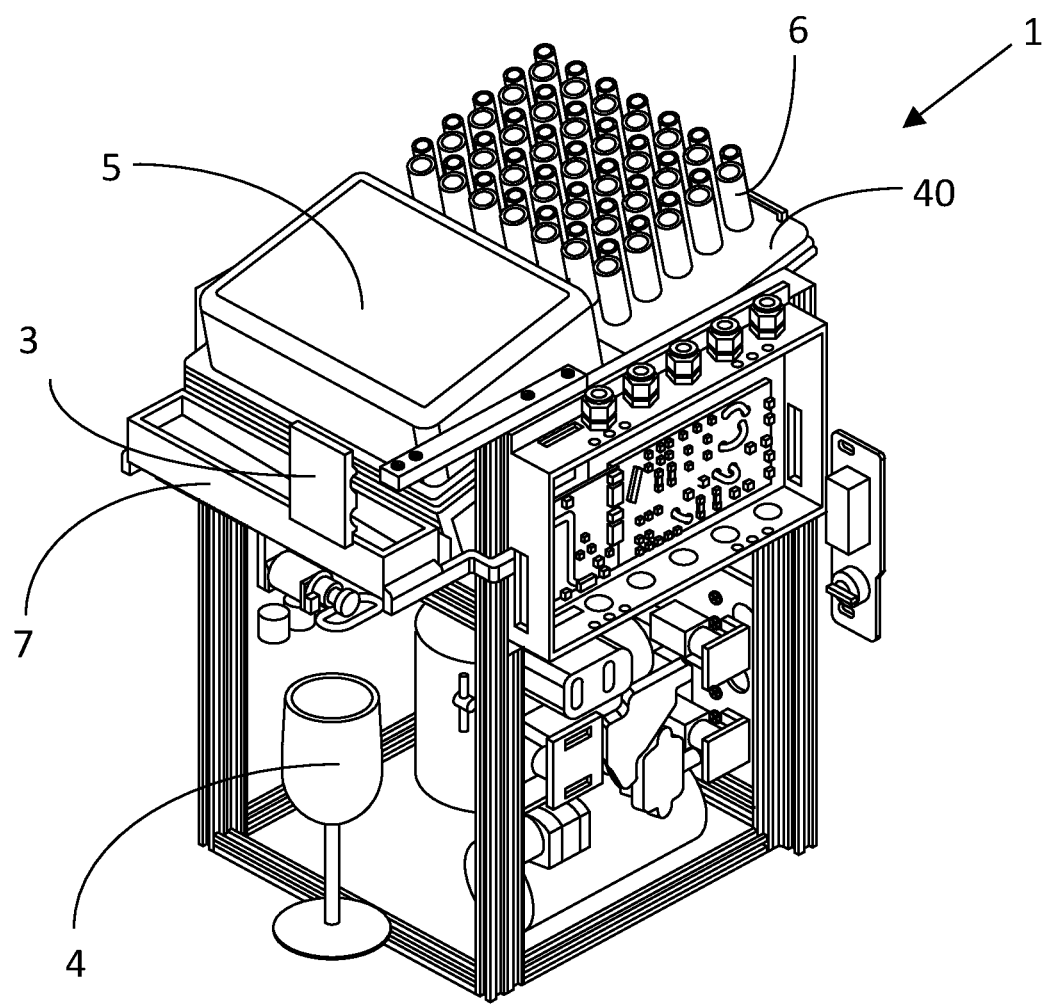
FIG. 2B illustrates an example of a fluid mixture dispensing system without its casing, in accordance with some embodiments.

FIGS. 2A and 2B illustrate examples of a fluid mixture dispensing system 1 in accordance with various embodiments. In some embodiments, the fluid mixture dispensing system is able to be used for beverage dispensing and/or for a wide variety of other types of fluid mixture dispensing. According to various embodiments, the fluid mixture dispensing system is able to be a countertop or consumer electronic device, or a larger device installed in a restaurant or other commercial business.

In some embodiments, fluid mixture dispensing system 1 includes a casing 2. In further embodiments, the casing is a protective outer casing that houses various internal components of the system. According to various embodiments, the internal components include one or more of at least some of each of the following: solvent reservoirs (e.g., a water reservoir and/or an alcohol reservoir); ingredient reservoirs; mixing channels; mixing chambers; heat exchangers (e.g., heaters/chillers); dissolution chambers; and various fluid moving mechanisms (e.g., valves, actuators, pumps, etc.). Fluid mixture dispensing system 1 optionally includes a user interface 3, such as a display, a keyboard, a touch pad and/or a touch screen. Fluid mixing dispensing system 1 may also be controlled in response to commands received over a network, such as from a computer or a smart phone.

At block 102 of FIG. 1, in some embodiments, the system (e.g., a controller of the system) receives a request for a fluid mixture (e.g., a beverage). In some embodiments, the request for the fluid mixture is received via a user interface. In some embodiments, the user interface includes a graphical user interface such as a touch screen. In some embodiments, the user interface is configured to display the request and/or any modifications that are made to the request (e.g., by a user via the user interface). For example, if a user requests a soda, the user interface optionally and/or selectively displays options to modify the soda, such as an amount of sugar to be added, a carbonation level, an overall volume, and/or a temperature, among others. In some embodiments, preparation of the requested fluid mixture is according to a predefined fluid mixture selected from a library of predefined fluid mixtures. In various embodiments, the library of predefined fluid mixtures (e.g., names of the predefined fluid mixtures, and/or formulas for the predefined fluid mixtures) is able to be displayed on the user interface for user selection. In some embodiments, the library of predefined fluid mixtures is stored remotely from the fluid mixture dispensing system, and is later sent or uploaded to the fluid mixture dispensing system. In various embodiments, the library of predefined fluid mixtures is sent to the controller and is stored in a memory of the controller. In some embodiments, the requested fluid mixture includes ingredient modifications made to a selected predefined fluid mixture. In various embodiments, the user makes the ingredient modifications using the user interface, or using commands sent over a network, such as from a computer or a smart phone.

In some embodiments, user selection of a predefined fluid mixture and any subsequent modifications are made on a computer (e.g., smart phone, tablet, etc.), distinct from the controller of the fluid mixture dispensing system, that is capable of sending the request to the fluid mixture dispensing system, such as over a network.

In some embodiments, the library of predefined fluid mixtures is a library containing a list of components (e.g., chemical compounds, such as ingredients and/or solvents) and corresponding amounts of each component for each predefined fluid mixture in the library. The list of components and corresponding amounts of each component for each predefined fluid mixture can be obtained from prior chemical analysis of the predefined fluid mixture. For example, a glass of Chardonnay with a particular recognizable style or variety can be defined by a constituent list of certain amounts of chemical components (such as acids, sugar solutions, etc.) that are mixed into a larger mixture of water and ethanol to form the glass of Chardonnay. The number of unique combinations of components can be unbounded. Thus, any particular fluid mixture (e.g., wine, soda, perfume, etc.) is assembled from a defined list of components and corresponding amounts of each component, such as from a chemical analysis of a desired fluid mixture. In some embodiments, the systems disclosed herein accept the predefined fluid mixture information (i.e., a recipe for each of the predefined fluid mixtures) digitally and then translate that information into a control process (e.g., control of mechanical/electromechanical valves and/or pumps) that dispenses the list of components in the corresponding amounts to form the requested fluid mixture. In various embodiments, the recipe for a predefined fluid mixture includes additional control information, such as a sequencing of operations, a description of one or more fluid paths to be used, temperature requirements, and/or control of other parts of the fluid dispensing system as required to prepare the predefined fluid mixture.

At block 104 of FIG. 1, in some embodiments, in response to receiving the request for the fluid mixture, the system optionally and/or selectively is configured to control one or more of the following: (1) flow a predetermined amount of at least one solvent from at least one solvent reservoir (e.g., a predetermined amount of water from a water reservoir and/or a predetermined amount of alcohol from an alcohol reservoir) and flow a predetermined amount of at least one ingredient from a plurality of ingredient reservoirs to at least one mixing channel to form an intermediate fluid mixture; (2) flow a predetermined amount of at least one solvent from at least one solvent reservoir (e.g., water from a water reservoir and/or alcohol from an alcohol mixture) to a mixing chamber; (3) flow a predetermined amount of at least one solvent from at least one solvent reservoir (e.g., a predetermined amount of water from a water reservoir and/or a predetermined amount of alcohol from an alcohol reservoir) and flow a predetermined amount of at least one ingredient from at least one ingredient reservoir to at least one dissolution chamber to form an intermediate fluid mixture; (4) flow a predetermined amount of at least one ingredient from at least one ingredient reservoir to the mixing chamber; and (5) flow intermediate fluid mixtures, if any, to the mixing chamber. Examples of fluid paths used in block 104 are illustrated throughout FIGS. 11 and 12.

Figure 11:
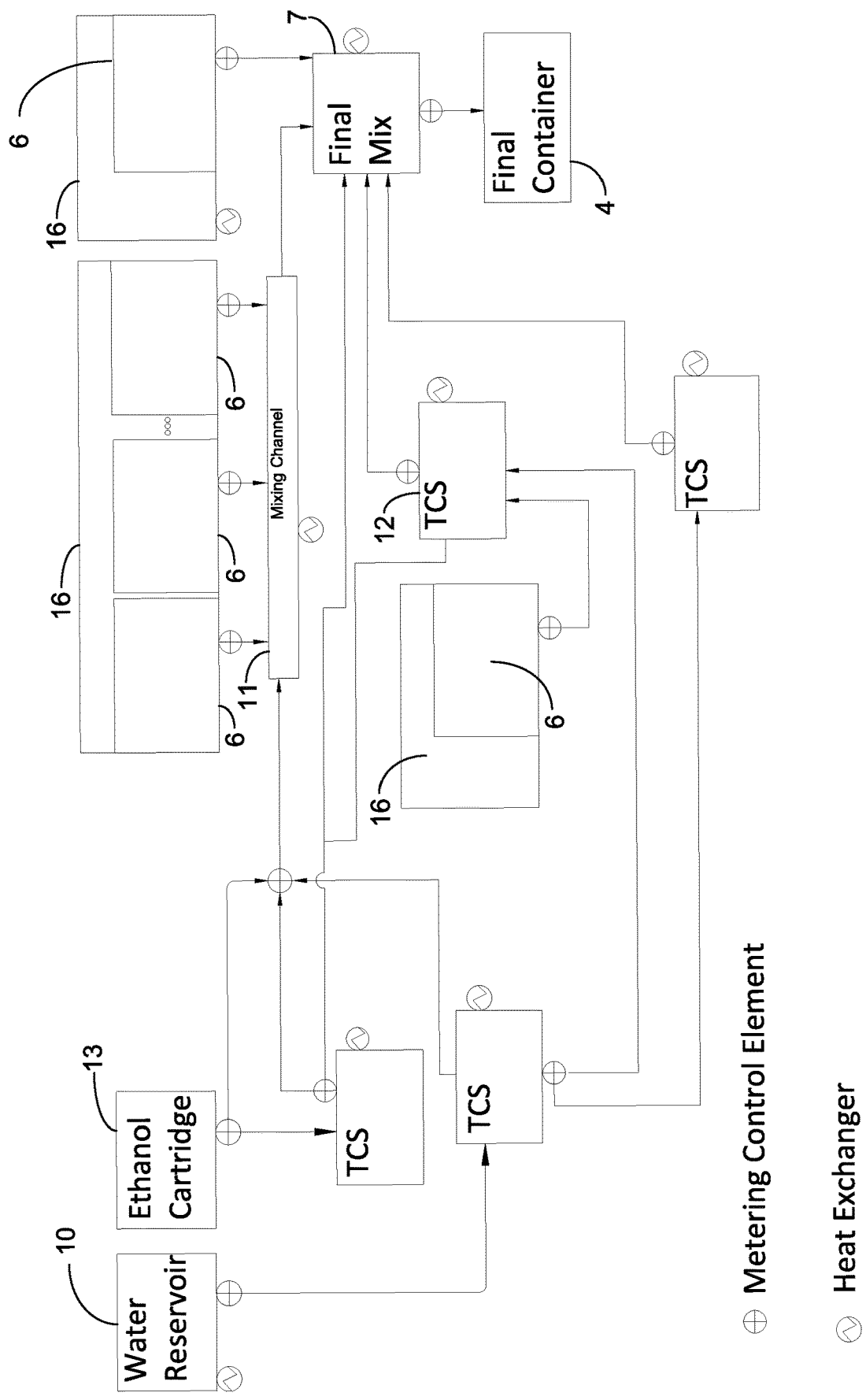
FIG. 11 illustrates an example system flow diagram of a fluid mixture system, in accordance with some embodiments.
Figure 12:
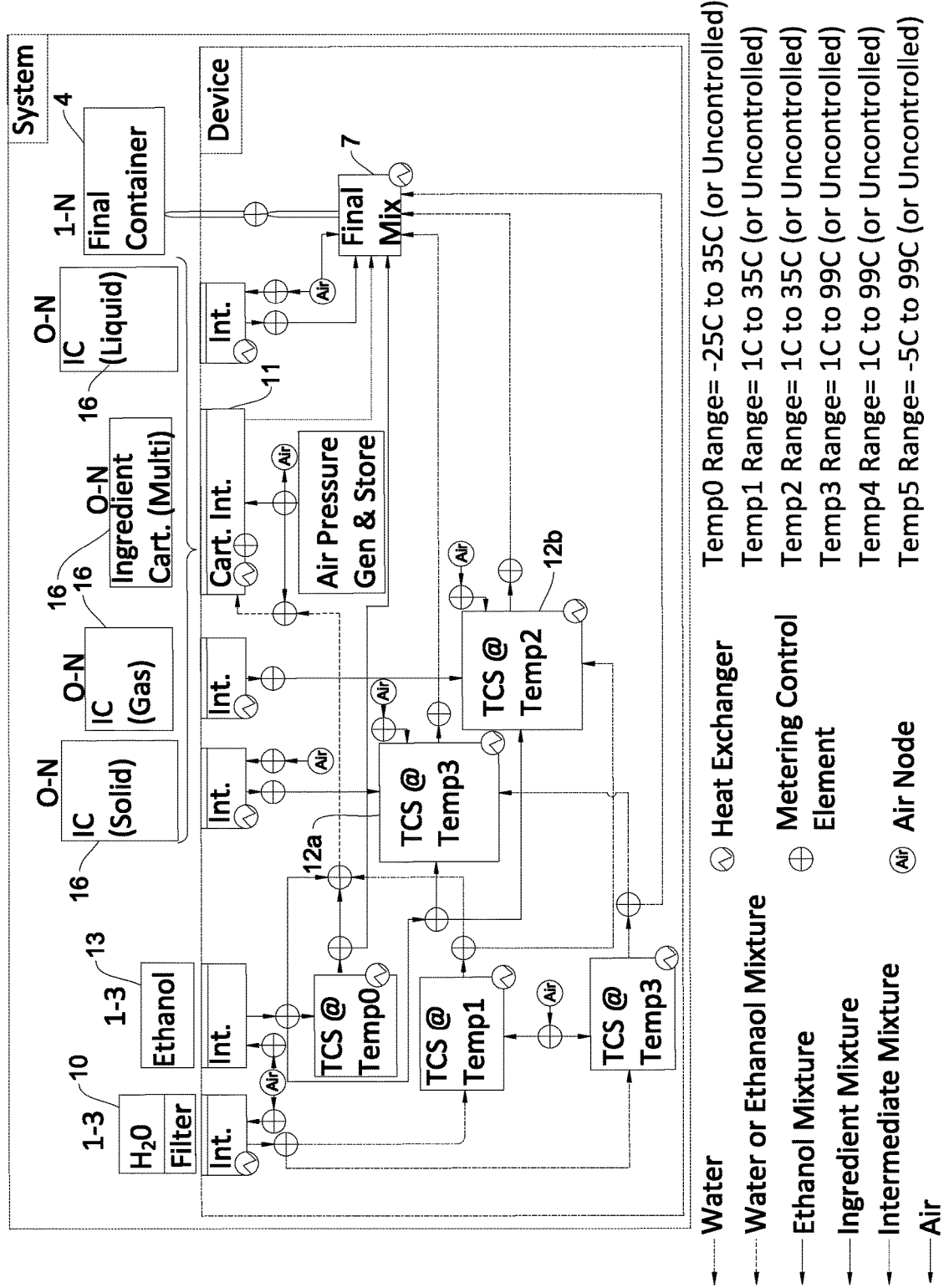
FIG. 12 illustrates another example system flow diagram of a fluid mixture system, in accordance with some embodiments.

FIGS. 11 and 12 illustrate example system flow diagrams of a fluid mixture dispensing system, according to various embodiments. In FIGS. 11 and 12, each heat exchanger is optionally included in a given system. When included, each one of the heat exchangers is able to selectively adjust the temperature (e.g., of what is flowing through it and/or what is attached to it) up or down. In various embodiments, the metering control element sets in FIGS. 11 and 12 include at least one of a valve, an electromotive element (e.g., a solenoid), a pump, a pressure sensor, a temperature sensor, a flow sensor, a mechanical component (e.g., a tee, a check valve, etc.), and/or any other control, routing, or sensor component used in fluid dispensing systems.

Figure 8:
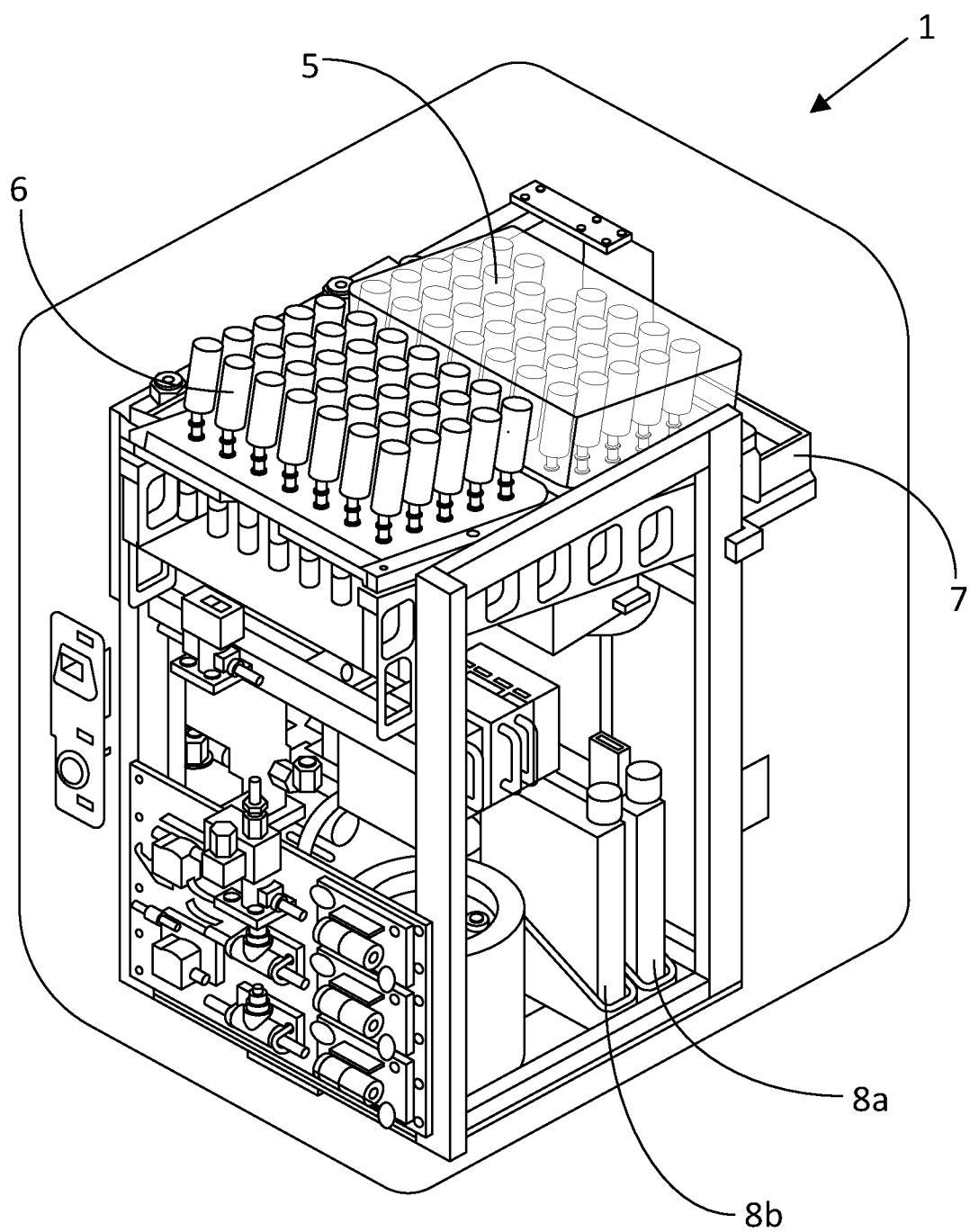
FIG. 8 illustrates an example of a rear view of a fluid mixture system with a transparent casing, in accordance with some embodiments.

In some embodiments, the system includes at least one solvent reservoir containing at least one solvent. In some embodiments, the at least one solvent comprises water, alcohol, ethyl lactate, and/or propylene glycol. The at least one solvent reservoir supplies the at least one solvent to the fluid mixture to be dispensed. For example, solvent reservoirs 8a (e.g., containing water) and 8b (e.g., containing alcohol) are illustrated in FIG. 8, and FIGS. 11 and 12 illustrate water reservoir 10. In some embodiments, the system includes a plurality of solvent reservoirs (e.g., one or multiple water reservoirs, one or multiple alcohol reservoirs, one or multiple propylene glycol reservoirs, one or multiple ethyl lactate reservoirs, and/or combinations of the foregoing, among other variations and/or types of solvent reservoirs). In various embodiments, any one of the at least one solvent in the at least one solvent reservoir is optionally and/or selectively diluted. For example, an alcohol reservoir contains 95% alcohol, not 100% alcohol. In some embodiments, a water reservoir or water inlet optionally includes or is fluidly connected to a water filter that is able to remove impurities from the water prior to flowing the water to other parts of the system (e.g., to a mixing chamber).

In some embodiments, the at least one solvent reservoir supplies solvent (e.g., any one or more of the at least one solvent) to the fluid mixture to be dispensed. For example, a water reservoir is able to supply water to the fluid mixture to be dispensed. In some embodiments, a solvent reservoir comprises a solvent container housed within the fluid mixture dispensing system to supply one or more solvents to the system. The one or more solvents are able to be used to dissolve or carry various ingredients to form the requested fluid mixture. In some embodiments, in response to receiving a request for a fluid mixture, the system (e.g., via a controller of the system controlling pumps and/or valves) flows a predetermined amount of at least one solvent from at least one solvent reservoir to at least one mixing channel to form an intermediate fluid mixture.

In some embodiments, a water reservoir comprises a water container housed within the fluid mixture dispensing system. In other embodiments, the water reservoir is a standard water outlet such as a faucet or water line that is connected to a water inlet of the fluid mixture dispensing system to supply water to the system. In some embodiments and/or usage scenarios, water is optionally and/or selectively used as a solvent to dissolve various ingredients to form a requested fluid mixture. In some embodiments, in response to receiving a request for a fluid mixture, the system flows a predetermined amount of water from a water reservoir to at least one mixing channel to form an intermediate fluid mixture. An example of this is illustrated in FIGS. 11 and 12, where, in some embodiments and/or usage scenarios, a predetermined amount of water flows to mixing channel 11. The predetermined amount of water is optionally and/or selectively mixed with alcohol from an alcohol reservoir (e.g., in ethanol cartridge 13) and/or ingredients from a plurality of ingredient reservoirs in mixing channel 11 to form an intermediate fluid mixture before flowing to final mixing chamber 7.

In some embodiments, in response to receiving a request for a fluid mixture, the system flows a predetermined amount of at least one solvent from at least one solvent reservoir to a mixing chamber. In some embodiments, in response to receiving the request for the fluid mixture, the system optionally and/or selectively flows a predetermined amount of water from a water reservoir to the mixing chamber. An example of this is illustrated in FIGS. 11 and 12, where, in some embodiments, a predetermined amount of water from water reservoir 10 is able to flow to final mixing chamber 7. Accordingly, the final mixing chamber is optionally and/or selectively fluidly connected to a water reservoir.

In some embodiments, the system includes at least one dissolution chamber (e.g., dissolution chamber 12 as illustrated in FIG. 11) to dissolve particular solid and/or gaseous ingredients before mixing in a mixing chamber, such as with other ingredients and/or solvents. In these embodiments, the controller is configured (according to a recipe) to optionally and/or selectively dispense a predetermined amount of at least one ingredient into the dissolution chamber for dissolution prior to the predetermined amount of the at least one ingredient entering the mixing chamber.

In some embodiments, in response to receiving a request for a fluid mixture, the system optionally and/or selectively flows a predetermined amount of at least one solvent from at least one solvent reservoir to a dissolution chamber to form an intermediate fluid mixture. In various embodiments, the at least one solvent reservoir is optionally and/or selectively fluidly connected to the dissolution chamber, and the dissolution chamber is optionally and/or selectively fluidly connected to a mixing chamber. In some embodiments, the system optionally and/or selectively flows a predetermined amount of at least one solvent from at least one solvent reservoir to a gas dissolution chamber for dissolving a gaseous ingredient, and optionally and/or selectively flows the gas-dissolved intermediate fluid mixture to a mixing chamber. In some embodiments, the system optionally and/or selectively flows a predetermined amount of at least one solvent from at least one solvent reservoir to a solid dissolution chamber for dissolving a solid ingredient, and optionally and/or selectively flows the solid-dissolved intermediate fluid mixture to a mixing chamber.

In some embodiments, in response to receiving a request for a fluid mixture, the system optionally and/or selectively flows a predetermined amount of water from a water reservoir to a dissolution chamber to form an intermediate fluid mixture. In various embodiments, the water reservoir is optionally and/or selectively fluidly connected to the dissolution chamber, and the dissolution chamber is optionally and/or selectively fluidly connected to a mixing chamber. FIG. 11 illustrates dissolution chamber 12, and FIG. 12 illustrates solid dissolution chamber 12a and gas dissolution chamber 12b. In various embodiments, the gases include nitrogen and/or carbon dioxide. In some embodiments, the system optionally and/or selectively flows a predetermined amount of water from a water reservoir to a gas dissolution chamber for dissolving a gaseous ingredient, and optionally and/or selectively flows the gas-dissolved intermediate fluid mixture to a mixing chamber. In some embodiments, the system optionally and/or selectively flows a predetermined amount of water from a water reservoir to a solid dissolution chamber for dissolving a solid ingredient, and optionally and/or selectively flows the solid-dissolved intermediate fluid mixture to a mixing chamber.

In some embodiments, a predetermined amount of at least one solvent is according to the requested fluid mixture. In other words, predetermined amount(s) of solvent(s) that, in total, are flowed to a final mixing chamber, whether directly flowed or in one or more intermediate fluid mixtures, correspond to amount(s) of the solvent(s) required to dispense the requested fluid mixture (e.g., a fluid mixture selected form the library of predefined fluid mixtures). In some embodiments, the predetermined amount of the at least one solvent flows from a solvent reservoir throughout the system via at least one pump.

In some embodiments, a predetermined amount of water is according to the requested fluid mixture. In other words, a predetermined amount of water that, in total, is flowed to a final mixing chamber, whether directly flowed or in one or more intermediate fluid mixtures, corresponds to a required amount of water in the requested fluid mixture (e.g., a fluid mixture selected from the library of predefined fluid mixtures). For example, if a glass of Chardonnay is selected and the predefined formula for Chardonnay calls for a total of 50 mL of water from the water reservoir, the system flows 50 mL of water to the final mixing chamber to be incorporated into the Chardonnay. In some embodiments, the predetermined amount of water flows from a water reservoir throughout the system via at least one pump.

In some embodiments, the system is configured to monitor an amount of at least one solvent in at least one solvent reservoir. For example, this is accomplished, in some embodiments, by various sensors and/or by tracking an amount of the at least one solvent that has been dispensed. When an amount of a solvent in a solvent reservoir is below a specified threshold, the system optionally and/or selectively notifies the user (e.g., via the user interface) that the solvent reservoir should be refilled or replaced. In some embodiments, the system is configured to monitor an amount of water in a water reservoir.

Figure 10:
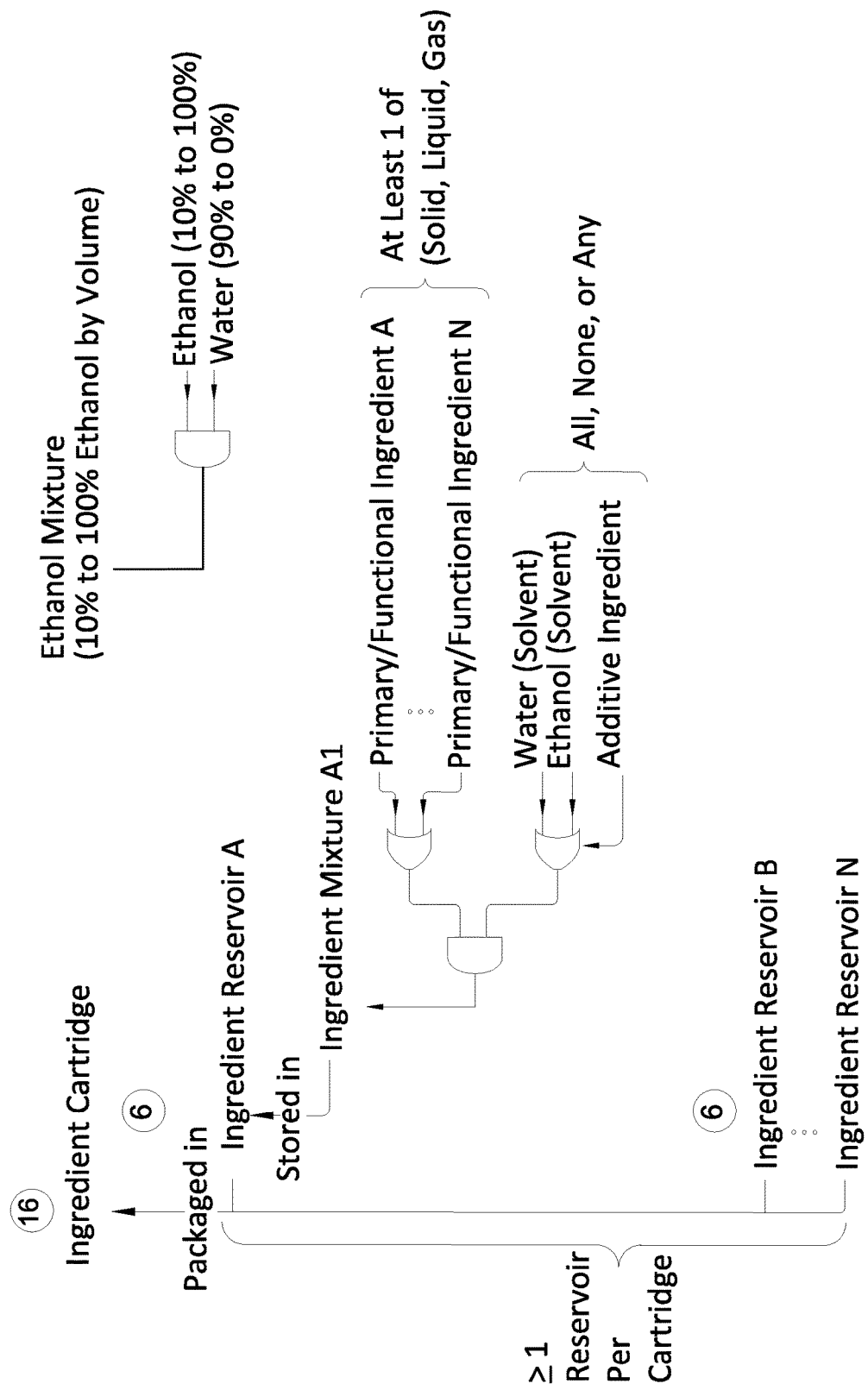
FIG. 10 illustrates an example of how an ingredient cartridge, an ingredient reservoir, and an ingredient mixture can be defined, in accordance with some embodiments.

In some embodiments, the system includes, in addition to one or more water reservoirs (such as water reservoir 10 illustrated in FIGS. 11 and 12), one or more other solvent reservoirs, such as a second solvent reservoir 8b (as illustrated in FIG. 8), or such as an alcohol reservoir in ethanol cartridge 13 (as illustrated in FIGS. 11 and 12). In some embodiments, the system includes a plurality of alcohol reservoirs. Any one or more of the alcohol reservoirs is able to supply alcohol to the fluid mixture to be dispensed. As stated above, the solvents in the solvent reservoirs comprise one or more of alcohol (e.g., ethanol), water, ethyl lactate, propylene glycol, and/or a wide variety of other alcohols and/or other solvents and their various combinations. As illustrated in FIG. 10, in various embodiments, alcohol in the alcohol reservoir is an alcohol mixture. In some embodiments, the alcohol mixture includes alcohol and water. For example, FIG. 10 illustrates that an alcohol solvent can be an alcohol mixture of 10-100% alcohol by volume with 0-90% of water by volume.

In some embodiments, an alcohol reservoir comprises an alcohol container housed within the fluid mixture dispensing system. Besides supplying alcohol to a fluid mixture, in various embodiments, alcohol is optionally and/or selectively used to dissolve various other ingredients to form an intermediate fluid mixture as part of a requested fluid mixture.

In some embodiments, in response to receiving a request for a fluid mixture, the system flows a predetermined amount of alcohol from an alcohol reservoir to at least one mixing channel to form an intermediate fluid mixture. An example of this is illustrated in FIGS. 11 and 12, where in some embodiments, a predetermined amount of alcohol optionally and/or selectively flows to mixing channel 11. The predetermined amount of alcohol is optionally and/or selectively mixed with water from a water reservoir and/or ingredients from a plurality of ingredient reservoirs in the at least one mixing channel to form an intermediate fluid mixture before flowing to a mixing chamber. In some embodiments, the water and the alcohol are mixed prior to entering the at least one mixing channel.

In some embodiments, in response to receiving a request for a fluid mixture, the system flows a predetermined amount of alcohol from an alcohol reservoir to a mixing chamber. An example of this is illustrated in FIGS. 11 and 12, where in some embodiments, a predetermined amount of alcohol from an alcohol reservoir (in ethanol cartridge 13) optionally and/or selectively flows to final mixing chamber 7. Accordingly, the final mixing chamber is optionally and/or selectively fluidly connected to an alcohol reservoir.

In some embodiments, in response to receiving a request for a fluid mixture, the system flows a predetermined amount of alcohol from an alcohol reservoir to a dissolution chamber to form an intermediate fluid mixture. In various embodiments, an alcohol reservoir is optionally and/or selectively fluidly connected to the dissolution chamber, and the dissolution chamber is optionally and/or selectively fluidly connected to a mixing chamber. FIG. 11 illustrates dissolution chamber 12, and FIG. 12 illustrates solid dissolution chamber 12a and gas dissolution chamber 12b. A solid dissolution chamber is configured to dissolve at least one solid ingredient (e.g., sugar) from at least one ingredient reservoir in a solvent (e.g., alcohol and/or water). A gas dissolution chamber is configured to dissolve at least one gaseous ingredient from at least one ingredient reservoir in a solvent (e.g., alcohol and/or water). In some embodiments, the system optionally and/or selectively flows a predetermined amount of alcohol from an alcohol reservoir to a gas dissolution chamber for dissolving a gaseous ingredient, and optionally and/or selectively flows the gas-dissolved intermediate fluid mixture to a mixing chamber. In some embodiments, the system optionally and/or selectively flows a predetermined amount of alcohol from an alcohol reservoir to a solid dissolution chamber for dissolving a solid ingredient, and optionally and/or selectively flows the solid-dissolved intermediate fluid mixture to a mixing chamber.

In some embodiments, a predetermined amount of alcohol is according to the requested fluid mixture. In other words, a predetermined amount of alcohol that, in total, flows to a final mixing chamber, whether directly or in one or more intermediate fluid mixtures, corresponds to a required amount of alcohol in the requested fluid mixture (e.g., a fluid mixture selected from the library of predefined fluid mixtures). For example, if a glass of Chardonnay is selected and the predefined formula for Chardonnay has 14% alcohol by volume, the system flows a predetermined amount of ethanol to the final mixing chamber to be incorporated such that the Chardonnay has 14% alcohol by volume (based on volume of the other solvents and/or ingredients) of the final dispensed fluid mixture. In some embodiments, the predetermined amount of alcohol flows from an alcohol reservoir throughout the system via at least one pump. In some embodiments, the system is configured to monitor an amount of alcohol in an alcohol reservoir.

In some embodiments, the system includes ingredient reservoirs 6 (as illustrated, for example, in FIGS. 2B, 3, 4B, 7, and 8). An ingredient reservoir includes an "ingredient," also referred to herein as an "ingredient mixture" to emphasize that the ingredient optionally comprises one or more components. As illustrated in FIG. 10, in some embodiments, an ingredient mixture includes at least one primary/functional ingredient. A primary/functional ingredient is at least one of a solid, a liquid, or a gas. One example of a primary/functional ingredient is a chemical compound. Use of the word "primary" does not require that a primary/functional ingredient is a component of an ingredient mixture present in a largest amount or concentration compared to other components of the ingredient mixture. For example, some primary/functional ingredients, such as capsaicin, are diluted with many times their volume of a solvent, such as water, to form an ingredient mixture. In some embodiments, a primary/functional ingredient includes: glycerine (glycerol), fructose, glucose, lactic acid, malic acid, tartaric acid, potassium phosphate tribasic, sucrose, potassium sulfate, succinic acid, acetic acid, citric acid, tricalcium phosphate, magnesium hydroxide, 3-methylbutan-1-ol, sodium phosphate dibasic, propanol, starter distillate 9x, ethyl acetate, 2-methylbutan-1-ol, 2-methylpropan-1-ol, 2-phenylethanol, oxolan-2-one, iron sulfate heptahydrate, octanoic acid, hexanoic acid, 3-methylbutyl acetate, decanoic acid, hexan-1-ol, ethyl octanoate, furan-2-ylmethanol, ethyl hexanoate, 2-methylpropanoic acid, furan-2-carbaldehyde, ethyl butanoate, 2,6-dimethoxyphenol, ethyl decanoate, hexyl acetate, 2-phenyl ethyl acetate, 3-methyl sulfanylpropan-1-ol, ethyl propionate, butan-1-ol, 4-hydroxy-3-methoxybenzaldehyde, 5-methylfuran-2-carbaldehyde, isobutyl acetate, 5-pentyloxolan-2-one, ethyl 2-methylpropanoate, 5-butyl-4-methyloxolan-2-one, 2-methoxy-4-methylphenol, 2-methoxy-4-prop-2-enylphenol, 2-methyoxyphenol, and/or coloring agents. In various embodiments, a primary/functional ingredient includes one or more other components, compounds, or chemicals used in the production of beverages, perfumes, detergents, cleansers, or other fluid mixtures.

In some embodiments, an ingredient mixture includes respective concentrations of one or more chemical compounds. In some embodiments, an ingredient mixture includes at least one solvent. In various embodiments, the at least one solvent is any solvent or combination of solvents disclosed herein. For example, an ingredient mixture in an ingredient reservoir is a mixture of citric acid (primary/functional ingredient) and water at a particular concentration. Another example ingredient mixture is a mixture of potassium sulfate (primary/functional ingredient), water, and ethanol. As described herein, one or more ingredient mixtures are optionally and/or selectively dispensed into a fluid stream (a single solvent, or a mixture of one or more solvents, e.g., water and/or ethanol) and combined together to form an intermediate fluid mixture.

In some embodiments, an ingredient mixture includes at least one of a solvent (e.g., water and/or an alcohol) and an additive ingredient. In various embodiments, an additive ingredient is at least one of a surfactant, a preservative, and/or an emulsifier/stabilizer. Examples of surfactants include anionic surfactants (e.g., sodium lauryl sulfate and/or sodium laureth sulfate, among others), and nonionic surfactants (e.g., cocamide monoethanolamine and/or cocamide diethanolamine, among others). Examples of preservatives include sodium benzoate and/or citric acid, among others. Examples of emulsifiers/stabilizers include gellan gum and/or guar gum, among others.

In some embodiments, an ingredient is stored in respective one of a plurality of ingredient reservoirs, such as ingredient reservoirs 6 as illustrated in FIGS. 2B, 3, 4B, 7 and 8. According to various embodiments, each of the ingredient reservoirs is of one or more types, such as: a bladder bag (e.g., 6B as illustrated in FIG. 5A); a syringe (e.g., 6A as illustrated in FIG. 5A); a gravity dispense chamber; a pellet dispenser; a pierceable volume; and any other container used for a solid (including crystalline, powdered, or other forms of a solid), a liquid, or a gas. In some embodiments, all of the ingredient reservoirs are of the same type. In other embodiments, the ingredient reservoirs are of two or more types. In further embodiments, an ingredient cartridge contains two or more types of ingredient reservoirs. In some embodiments, the system includes a plurality of ingredient reservoirs. In other embodiments, the system includes solely a single ingredient reservoir. According to various embodiments, ingredient reservoirs are of one or more sizes, such as (for liquid volume measurements) one ounce, two ounces, four ounces, eight ounces, 16 ounces, 32 ounces, or any other size. In some embodiments, all of the ingredient reservoirs in an ingredient cartridge are of a same size; in other embodiments, an ingredient cartridge contains ingredient reservoirs of two or more sizes, such as a small (e.g., one ounce or two ounce), a medium (e.g., four ounce or eight ounce), and a large (e.g., 16 ounce or 32 ounce) size. For example, a size of a particular ingredient reservoir is selected according to expected requirements for the ingredient in the particular ingredient reservoir. In various embodiments, two or more ingredient reservoirs in a same ingredient cartridge contain the same ingredient.

In some embodiments, in response to receiving a request for a fluid mixture, the system flows a predetermined amount of at least one ingredient from a plurality of ingredient reservoirs to at least one mixing channel to form an intermediate fluid mixture. An example of this is illustrated in FIG. 11, where, in some embodiments, a predetermined amount of at least one ingredient selectively flows from one or more ingredient reservoirs 6 to mixing channel 11. The predetermined amount of the at least one ingredient is mixed with at least one solvent (e.g., water from a water reservoir and/or alcohol from an alcohol reservoir) in mixing channel 11 before flowing to final mixing chamber 7. The at least one solvent is able to dissolve the at least one ingredient and/or to carry the at least one ingredient to the final mixing chamber.

In some embodiments, in response to receiving a request for a fluid mixture, the system flows a predetermined amount of at least one ingredient from at least one ingredient reservoir to a mixing chamber. An example of this is illustrated in FIG. 11, where in some embodiments, a predetermined amount of at least one ingredient from one or more ingredient reservoirs 6 selectively flows to final mixing chamber 7. As illustrated, at least one ingredient reservoir is fluidly connected to a mixing chamber (such as the final mixing chamber). The at least one ingredient reservoir that is configured to flow an ingredient directly to the mixing chamber is optionally and/or selectively not one of the ingredient reservoirs that is fluidly connected to a mixing channel, such as mixing channel 11 as illustrated in FIGS. 11 and 12.

In some embodiments, in response to receiving a request for a fluid mixture, the system flows a predetermined amount of at least one ingredient from at least one ingredient reservoir to a dissolution chamber to form an intermediate fluid mixture. In further embodiments, at least one ingredient reservoir is fluidly connected to the dissolution chamber, and the dissolution chamber is fluidly connected to a mixing chamber. FIG. 11 illustrates a dissolution chamber 12, and FIG. 12 illustrates solid dissolution chamber 12a and gas dissolution chamber 12b. A solid dissolution chamber is configured to dissolve at least one solid ingredient (e.g., solid citric acid) from at least one ingredient reservoir in solvent (e.g., alcohol and/or water). A gas dissolution chamber is configured to dissolve at least one gaseous ingredient (e.g., $CO_2$) from at least one ingredient reservoir in solvent (e.g., water). In some embodiments, the at least one ingredient reservoir that is configured to flow an ingredient to the dissolution chamber is optionally and/or selectively not one of the ingredient reservoirs that is fluidly connected to a mixing channel, such as mixing channel 11 as illustrated in FIGS. 11 and 12. After the at least one ingredient is dissolved in solvent in the dissolution chamber, the dissolved intermediate fluid mixture flows to a mixing chamber, such as final mixing chamber 7 as illustrated in FIGS. 11 and 12.

In some embodiments, predetermined amount(s) of the ingredient(s) are according to the requested fluid mixture. In other words, the predetermined amount(s) of the ingredient(s) that, in total, are flowed to the final mixing chamber, whether flowed directly or in one or more intermediate mixtures, correspond to required amount(s) of the ingredient(s) in the requested fluid mixture (e.g., a fluid mixture selected form the library of predefined fluid mixtures).

In some embodiments, the system is configured to monitor an amount of an ingredient in an ingredient reservoir. For example, this is accomplished, in some embodiments, by various sensors and/or by tracking an amount of the ingredient that has been dispensed. When an amount of an ingredient in an ingredient reservoir is below a specified threshold, the system optionally and/or selectively notifies the user (e.g., via the user interface) that the ingredient reservoir needs to be refilled or replaced. In some embodiments, this includes replacing a cartridge that stores the ingredient reservoir as explained in more detail below.

In some embodiments, a predetermined amount of an ingredient from an ingredient reservoir is configured to be dispensed via at least one pump, such as a microfluidic pump, into a mixing channel, a mixing chamber, and/or a dissolution chamber. In some embodiments, each ingredient reservoir is fluidly connected to a respective microfluidic pump for dispensing an ingredient in the ingredient reservoir to a mixing channel, a mixing chamber, and/or a dissolution chamber. In some embodiments, multiple ingredient reservoirs are fluidly connected to a single microfluidic pump for dispensing ingredients from the ingredient reservoirs.

Figure 7:
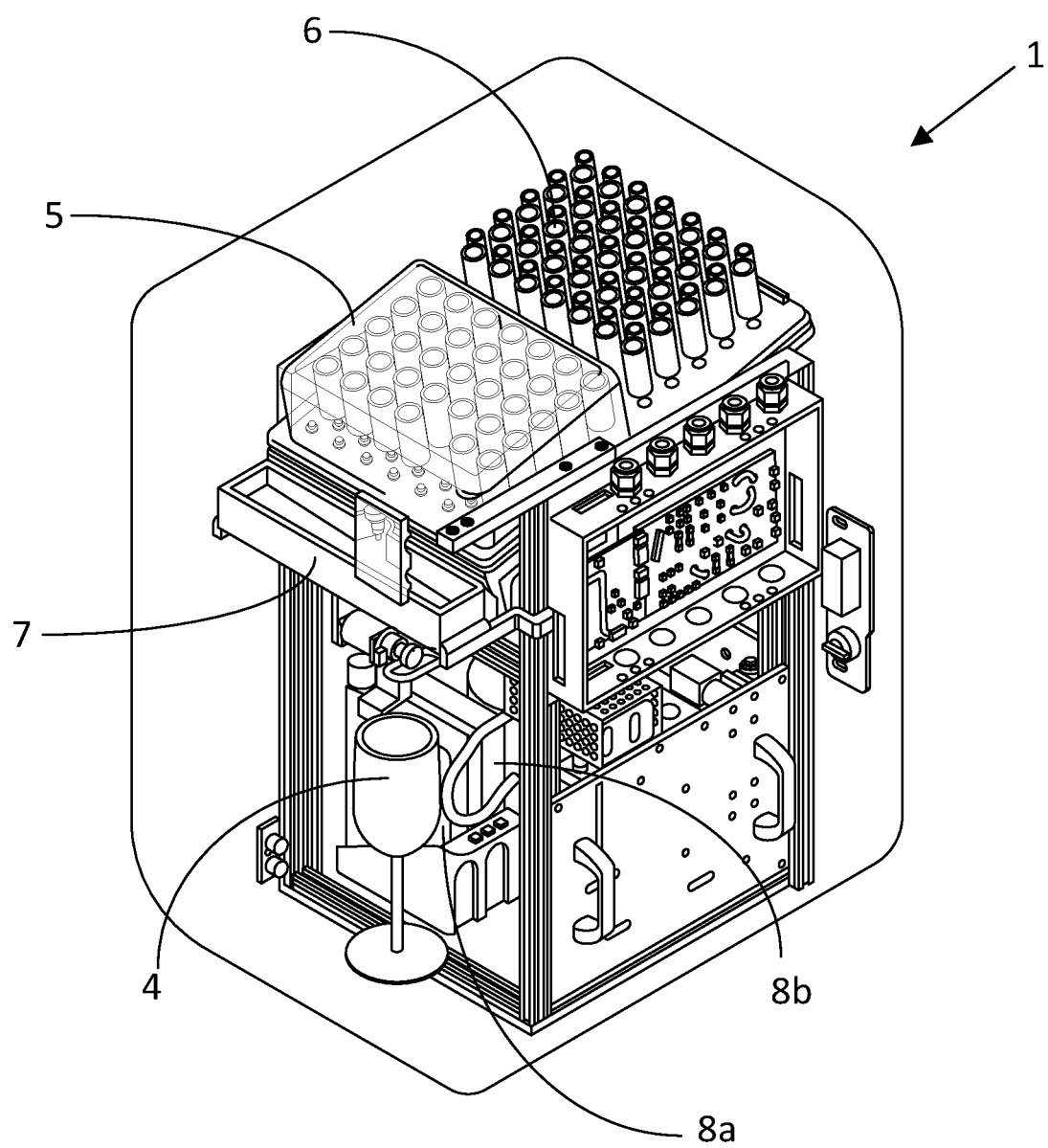
FIG. 7 illustrates a view of an example of a front view of a fluid mixture system with a transparent casing, in accordance with some embodiments.

In some embodiments, at least one ingredient reservoir is packaged in an ingredient cartridge, illustrated as ingredient cartridge 5 in FIGS. 7 and -8, or ingredient cartridge 16 in FIGS. 10, 11, and 12. In some embodiments, the system includes at least one ingredient cartridge. In further embodiments, the system includes two or more ingredient cartridges, and each of the two or more ingredient cartridges is of any type: a solid ingredient cartridge; a liquid ingredient cartridge; a gaseous ingredient cartridge; or a multi-ingredient cartridge. For example, FIG. 12 illustrates at least one of 0 to N solid ingredient cartridges, 0 to N gaseous ingredient cartridges, 0 to N multi-ingredient cartridges, and 0 to N liquid ingredient cartridges. In some embodiments, an ingredient cartridge includes a plurality of ingredient reservoirs. In further embodiments, an ingredient cartridge, such as a multi-ingredient cartridge, includes two or more of: an ingredient reservoir for solid ingredients; an ingredient reservoir for liquid ingredients; and an ingredient reservoir for gaseous ingredients.

In some embodiments, at least one ingredient cartridge is configured to dispense a predetermined amount of at least one ingredient from at least one ingredient reservoir to a mixing channel, a mixing chamber, and/or a dissolution chamber. In some embodiments, the at least one ingredient cartridge is removably attached to the fluid mixture dispensing system so that the at least one ingredient cartridge is refillable, replaceable, serviceable, and/or recyclable. In some embodiments, the fluid mixture dispensing system is able to operate with an ingredient cartridge missing (e.g., not installed), partly empty (e.g., only some ingredient reservoirs empty), and/or (fully) empty.

In some embodiments, a predetermined amount of at least one ingredient in at least one ingredient reservoir is dispensed via at least one valve into a mixing channel, a mixing chamber, and/or a dissolution chamber. In some embodiments, each ingredient reservoir has a respective valve and a respective actuator (e.g., an electromechanical valve, such as a solenoid valve, has a valve portion and an actuator portion). In some embodiments, each respective valve is configured to enable and/or control a flow of a respective ingredient from an ingredient reservoir, via a respective orifice of the ingredient reservoir, to a mixing channel, a mixing chamber, and/or a dissolution chamber. For example, the respective valve, when closed, provides a respective seal over the respective orifice of the ingredient reservoir, and when opened, enables the flow of the respective ingredient from the ingredient reservoir. In various embodiments, the respective valve comprises a membrane (such as membrane 30 as illustrated in FIGS. 5B, 5C, 5D, and 5E) that forms the respective seal when pressed against the respective orifice, and that enables the respective ingredient to be dispensed when not pressed against the respective orifice.

In some embodiments, at least one ingredient cartridge is pressurizable and/or includes a respective pressurized chamber inside the at least one ingredient cartridge (e.g., a respective interior chamber). References herein to a pressurized chamber refer to this pressurized chamber of the ingredient cartridge, whether it is, in some embodiments, the ingredient cartridge itself, or whether it is, in other embodiments, an interior chamber of the ingredient cartridge. The pressurized chamber houses a plurality of ingredient reservoirs such that a pressure (e.g., a pressure of gas in the pressurized chamber) is applied to the ingredient reservoirs. FIG. 12, for example, illustrates air nodes of a pneumatic system ("Air Pressure Generation and Storage") supplying pressurized air to various types of cartridges. In some embodiments, the system is configured to monitor (such as with a pressure sensor) and/or to control the pressure in the pressurized chamber. In various embodiments, the pressurized chamber is pressurized such that when the respective valve of one of the ingredient reservoirs is opened, the ingredient stored in that ingredient reservoir flows (at least in part in response to the pressure) out of the ingredient reservoir towards a mixing channel, a mixing chamber, and/or a dissolution chamber. In further embodiments, the pressurized chamber is raised above a specified minimum pressure prior to when any of the respective valves of the ingredient reservoirs are opened.

In some embodiments, a mixing channel, the mixing chamber, and/or a dissolution chamber is fluidly connected to valve outputs of the ingredient reservoirs such that opening one of the respective valves results in the respective ingredient flowing to a mixing channel, a mixing chamber, and/or a dissolution chamber. In some embodiments, the controller is configured to control a flow of a predetermined amount to be dispensed of the respective ingredient from a particular one of the ingredient reservoirs by opening the respective valve of the particular ingredient reservoir for a time duration based on one or more of the pressure in the pressurized chamber, the physical flow characteristics (e.g., the viscosity, which may be temperature-dependent) of the respective ingredient in the particular ingredient reservoir, a diameter of an opening of the respective valve of the particular ingredient reservoir, and/or a size of the respective orifice of the particular ingredient reservoir. In various embodiments, the system is calibrated to dispense/flow a predetermined amount of the respective ingredient to a mixing channel, a mixing chamber, and/or a dissolution chamber based on the pressure in the pressurized chamber, the physical flow characteristics of the respective ingredient, a diameter of the opening of the respective valve and/or a diameter of the respective orifice. In some embodiments, a time duration that a valve is open proportionally corresponds to amounts/concentrations of at least one ingredient of a list of ingredients of a requested fluid mixture (e.g., as obtained from a chemical analysis of the components required to produce the requested fluid mixture).

In some embodiments, the respective ingredients stored in the ingredient reservoirs are ported to the respective valves of the ingredient reservoirs via the respective orifices. In some embodiments, the ingredient reservoirs (through the respective valves) are able to open to a mixing channel, such as mixing channel 11 as illustrated in FIGS. 11 and 12. In some embodiments, a plurality of ingredient reservoirs is fluidly connected to a single mixing channel. In various embodiments, one mixing channel is fluidly connected to one or more other mixing channels. In some embodiments, a first mixing channel is fluidly connected to a first plurality of ingredient reservoirs, and a second mixing channel is fluidly connected to a second plurality of ingredient reservoirs. For example, a first mixing channel is fluidly connected to five to 20 ingredient reservoirs, and a second mixing channel is fluidly connected to five to 20 of the same or of different ingredient reservoirs. In various embodiments, at least one solvent (e.g., water and/or ethanol) flows through a mixing channel and mixes with any ingredient dispensed into the mixing channel. In some embodiments, the at least one solvent is dispensed into the mixing channel in order to remove any leftover ingredients.

Figure 3:
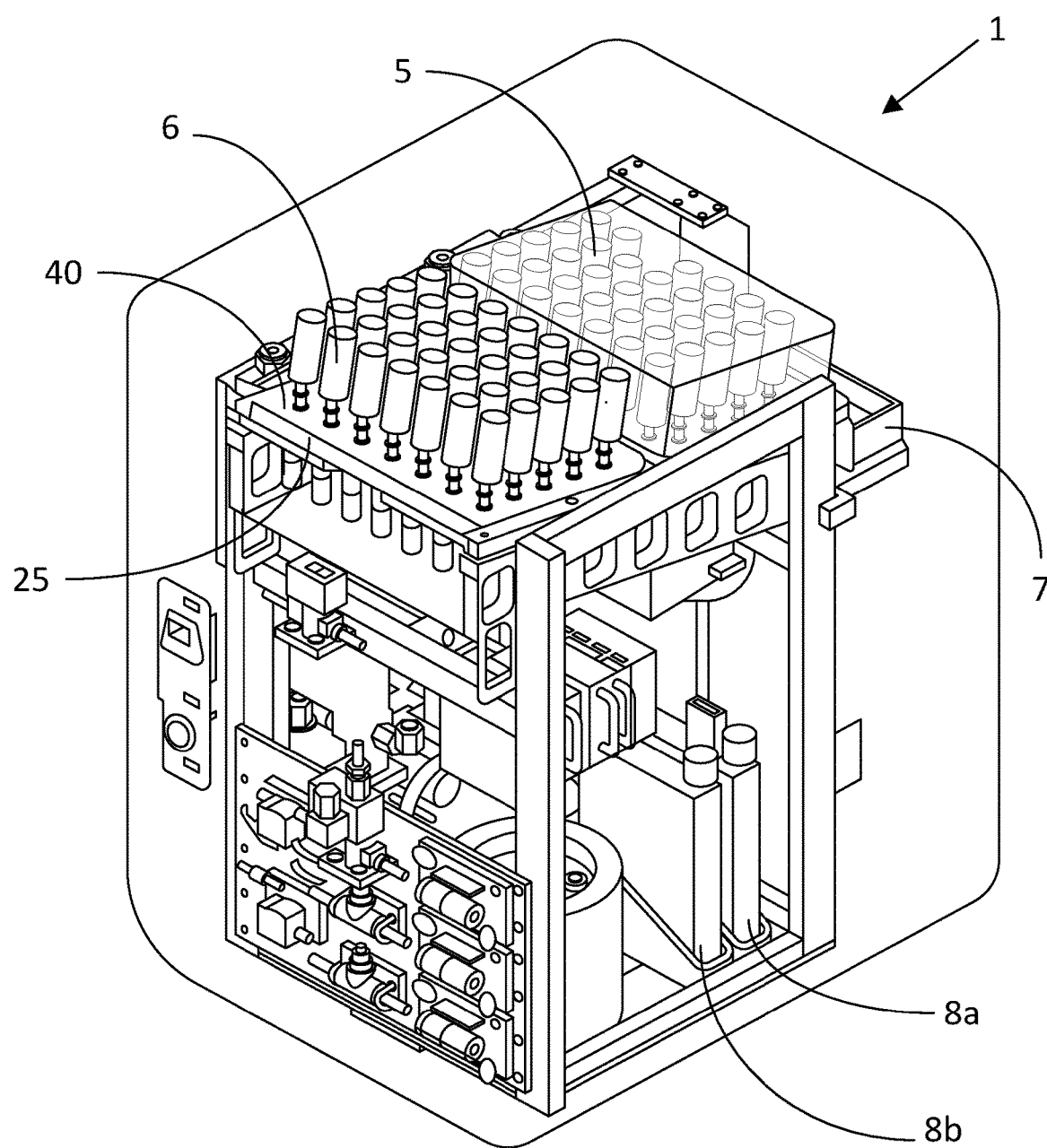
FIG. 3 illustrates an example of a fluid mixture dispensing system with a transparent casing having a water reservoir and an alcohol reservoir, in accordance with some embodiments.
Figure 4A:
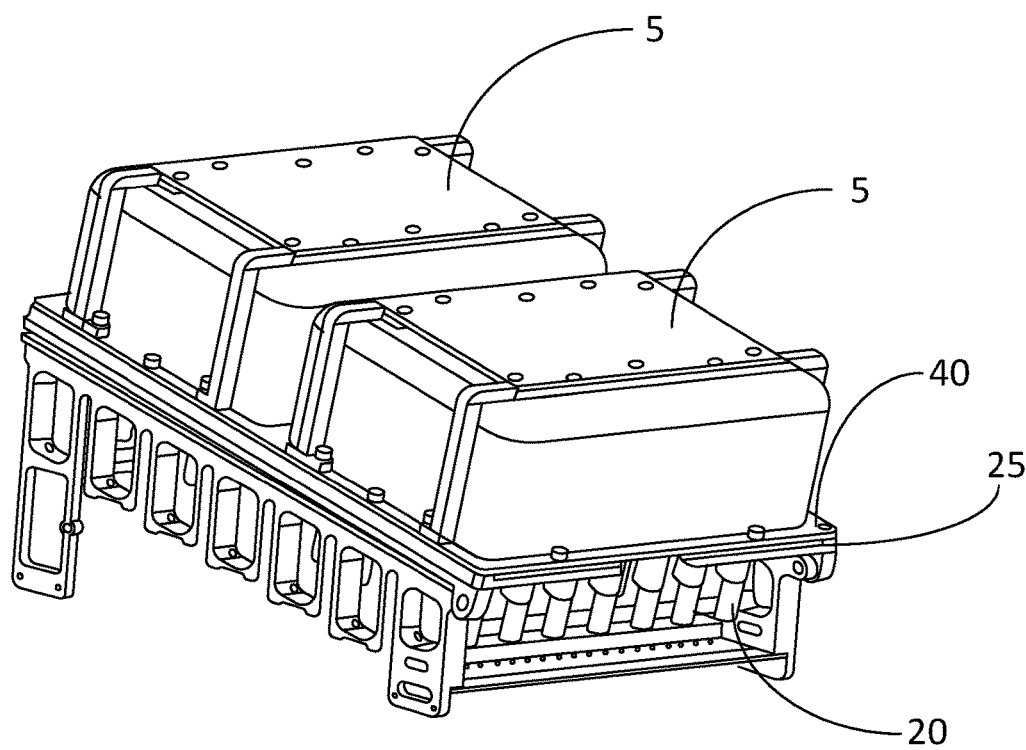
FIG. 4A illustrates an example of multiple cartridges of a fluid mixture dispensing system, in accordance with some embodiments.
Figure 4B:
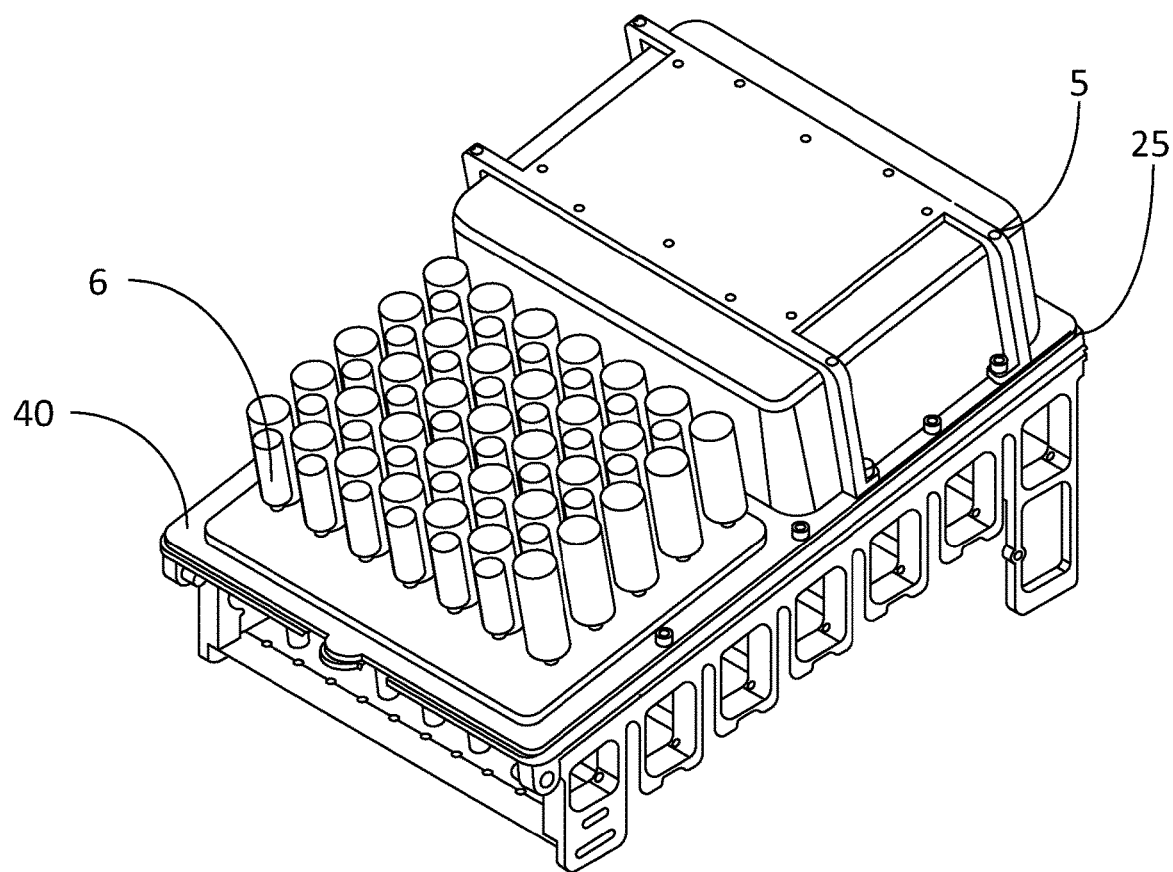
FIG. 4B illustrates an example of the inside of a cartridge of a fluid mixture dispensing system, in accordance with some embodiments.
Figure 5A:
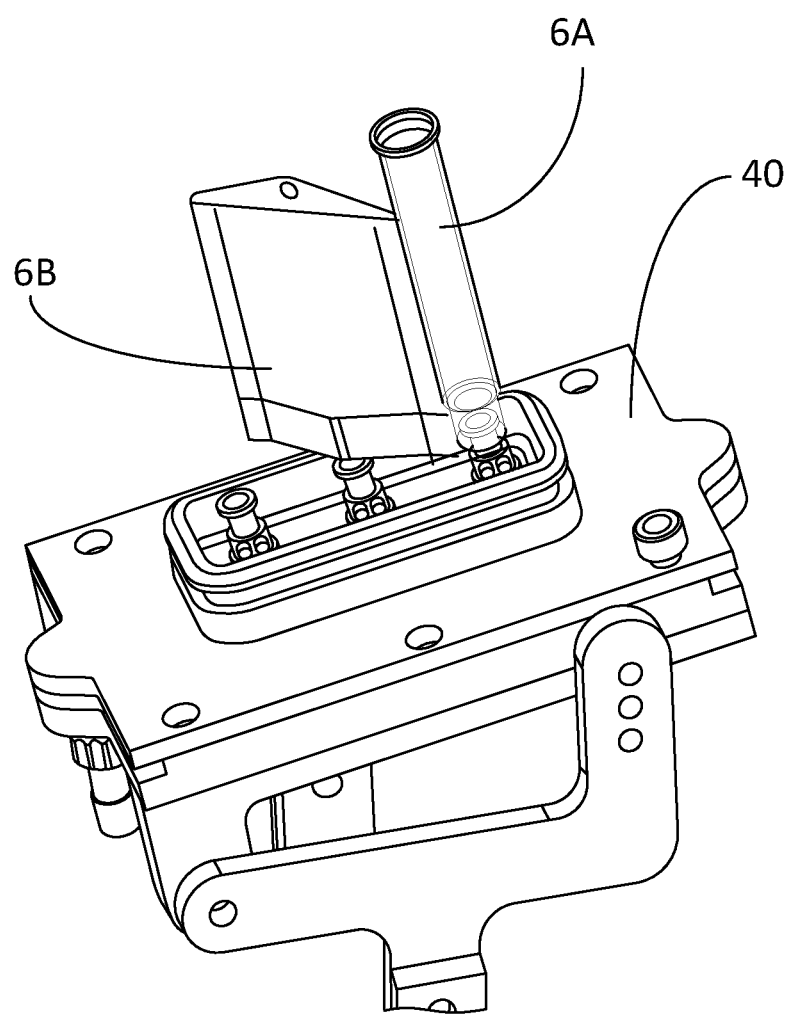
FIG. 5A illustrates an example of a simplified plurality of ingredient reservoirs of a fluid mixture dispensing system, in accordance with some embodiments.
Figure 5B:
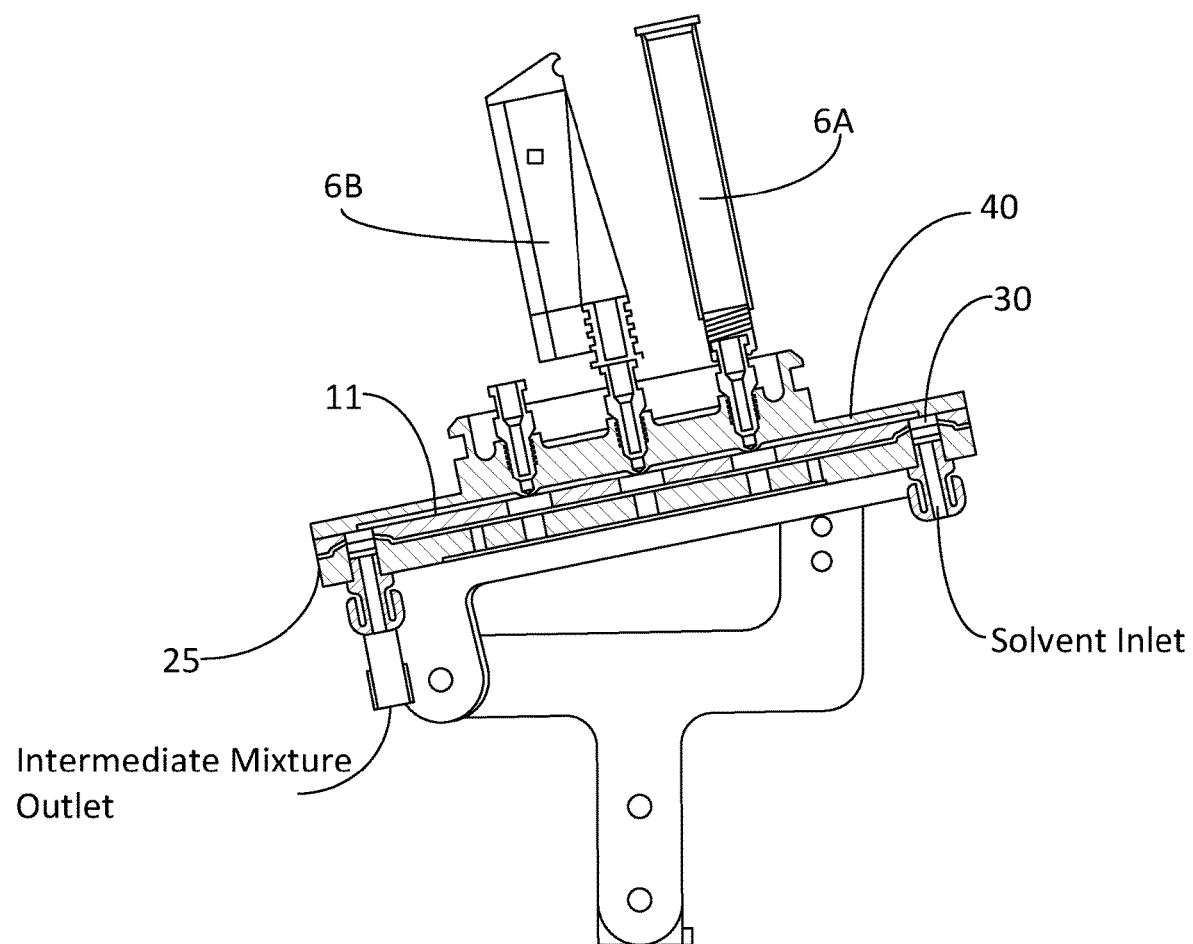
FIG. 5B illustrates an example of a cross section of the simplified plurality of ingredient reservoirs of the fluid mixture dispensing system of FIG. 5A, in accordance with some embodiments.

In some embodiments, one or more mixing channels are formed into the bottom of a plate, such as plate 40 as illustrated in FIGS. 3, 4A and 4B. For example, the one or more mixing channels are formed by welding and/or brazing a structure onto a surface of the plate, by etching and/or carving the one or more mixing channels into a surface of the plate, and/or by other techniques to create the one or more mixing channels in or on a surface of the plate. All the one or more mixing channels are optionally and/or selectively fluidly connected to one or more solvent reservoirs and to a mixing chamber. For example, in some embodiments, solvent enters at least one mixing channel, and at least one ingredient from at least one ingredient reservoir flows into the at least one mixing channel to form an intermediate fluid mixture with the solvent which then flows to a mixing chamber.

Figure 5C:
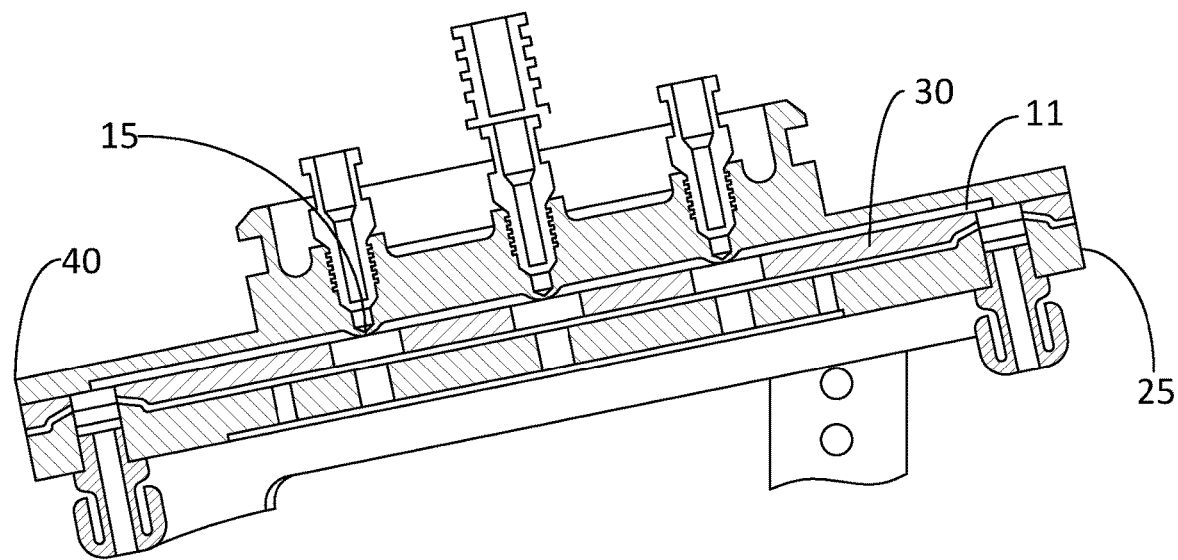
FIG. 5C illustrates a magnified version of FIG. 5B, in accordance with some embodiments.
Figure 5D:
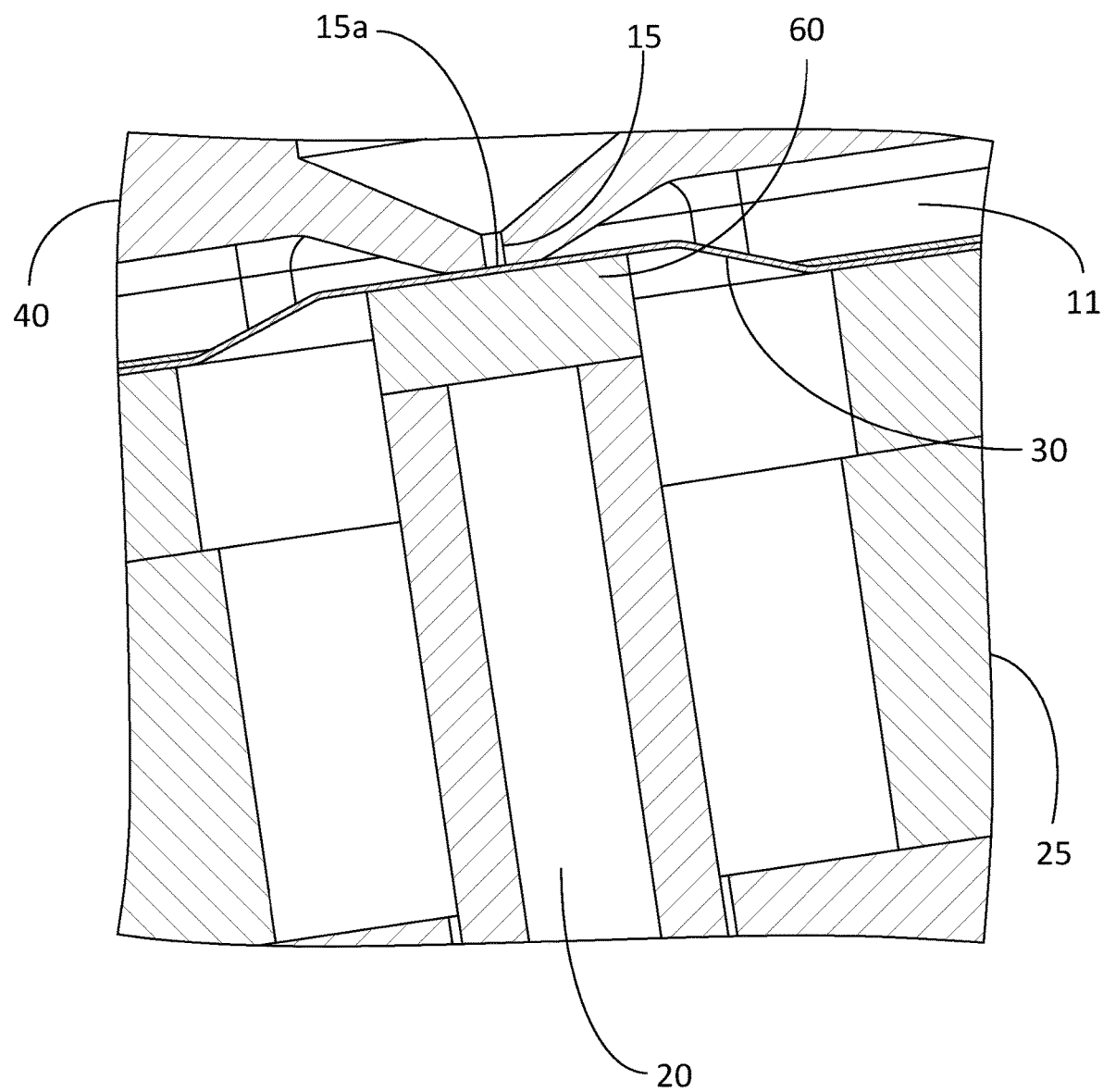
FIG. 5D illustrates a magnified view of an ingredient reservoir in the closed position to a mixing channel, in accordance with some embodiments.
Figure 5E:
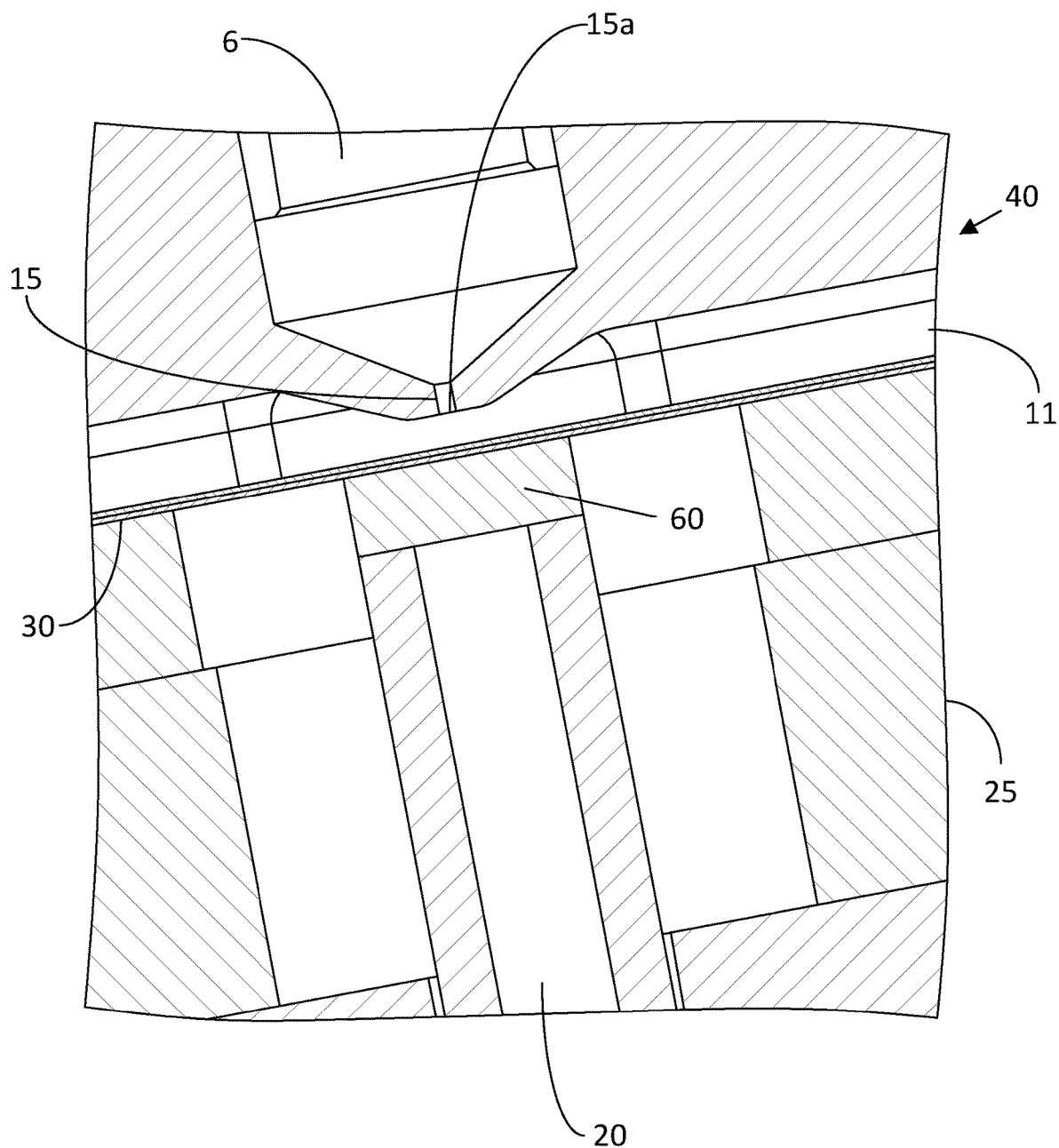
FIG. 5E illustrates a magnified view of an ingredient reservoir in the open position to a mixing channel, in accordance with some embodiments.
Figure 6:
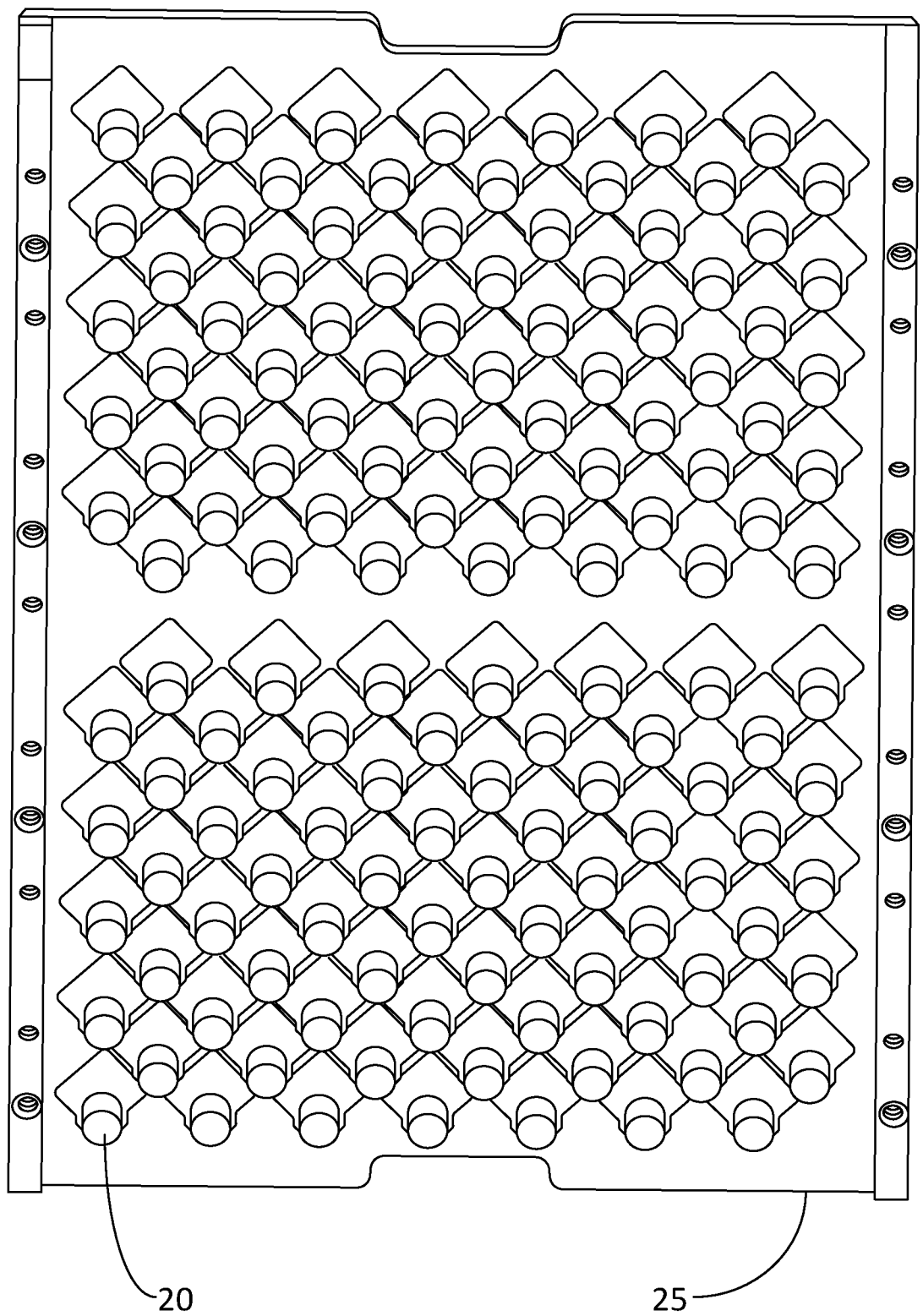
FIG. 6 illustrates an example of solenoids, on the underside of a base plate, that can control ingredient dispensing into mixing channels of a fluid mixture dispensing system, in accordance with some embodiments.

In some embodiments, the respective valve of an ingredient reservoir is able to open (e.g., to unseal) the respective orifice of the ingredient reservoir (such as orifice 15 as illustrated in FIGS. 5C, 5D, and 5E) so that the ingredient reservoir is able to dispense at least some of its contents into a mixing channel (such as mixing channel 11 as illustrated in FIGS. 5C, 5D, and 5E). In some embodiments, the ingredient reservoir connects to a membrane valve via a flat plate orifice that dispenses output from the ingredient reservoir. For example, a dispensing end of the ingredient reservoir is a flat plate with the respective orifice in (or near) the middle of the flat plate. When a membrane (e.g., membrane 30 as illustrated in FIGS. 5B, 5C, 5D, and 5E) is forced (e.g., pressed) against the respective orifice, no ingredient is able to flow out of the ingredient reservoir (i.e., pressing the membrane against the respective orifice closes the respective valve). In various embodiments, a compliant material (such as compliant material 60 as illustrated in FIGS. 5D and 5E) such as a rubber pad (e.g., a fluoroelastomer pad) is pushed up (e.g., pressed) against the membrane by action of an actuator (such as actuator 20 as illustrated in FIGS. 5D and 5E) so that the membrane closes (e.g., seals) valve face 15a (i.e., seals the respective orifice by closing the respective valve). In further embodiments, the compliant material is a material with a low set capability such that it provides a consistent even seal over time. In some embodiments, a purpose of the compliant material is to allow for misalignment of the actuator and still provide a good seal for the valve seat/orifice. In other words, the compliant material is such that it is amenable to closing the respective orifice when it is pushed up (e.g., pressed) against the membrane and valve. In various embodiments, an area of the actuator (and/or of the compliant material at the head of the actuator) is much larger than an area of the respective orifice, allowing the actuator to not be centered on the respective orifice and still be able to effect sealing of the respective orifice. However, even when an ingredient reservoir is in the closed position (i.e., the respective orifice is sealed by the actuator forcing the membrane against the respective orifice), any fluid/solvent, such as water and/or alcohol, as well as any ingredients dispensed from other ingredient reservoirs, is able to flow through the mixing channel and around the closed ingredient reservoir. For example, in various embodiments, the actuator and the membrane, when sealing the respective orifice, do not obstruct an entire width of the mixing channel. However, when there is no force pushing (e.g., pressing) the membrane against the respective orifice (e.g., as illustrated in FIG. 5E), the respective ingredient is able to flow through the respective orifice to the mixing channel.

In some embodiments, as described above, at least one solvent from at least one solvent reservoir is sent to a mixing channel such that any ingredient dispensed from the ingredient reservoirs into the mixing channel is mixed with the at least one solvent to form an intermediate fluid mixture.

In various embodiments, a diameter of the respective orifice of a particular one of the ingredient reservoirs ranges from about 0.01 to 5 mm or about 0.05 to 1 mm, depending on physical flow characteristics (e.g., viscosity) of the respective ingredient stored in the particular ingredient reservoir. The diameter of the respective orifice determines, at least in part, a flow rate through the respective orifice for a given ingredient's physical flow characteristic and pressurized chamber pressure. In some embodiments, the valve and ingredient reservoir assembly is interfaced with actuators (e.g., solenoids), such as actuators 20 as illustrated in FIGS. 5D and 5E, that are connected to a base plate, such as base plate 25 as illustrated in FIGS. 4A, 4B, 5B, 5C, 5D and 6. Each of the actuators has a respective plunger that is pre-loaded against a respective one of the respective valves by respective springs or other forces. In some embodiments, the respective plungers are pre-loaded with approximately at least or equal to about 1 N against the respective valves by the respective springs. In some embodiments with solenoid actuators, the respective plungers are biased by the respective springs away from the solenoid coils such that the respective plungers push (e.g., press) with a controlled preloaded amount of force against the respective valves (e.g., against the membrane), so that in a default state of a particular solenoid, when the particular solenoid is not activated, the respective valve is sealed.

In some embodiments, the pressurized chamber pressure is regulated by the controller and the respective orifices are of diameters and thicknesses with known tolerances to ensure that a flow rate of the respective ingredients is predictable and of a determined accuracy. With a predictable flow rate (of a determined accuracy), valve open duration is usable to control a dispensed amount (e.g., volume) of an ingredient. In some embodiments, calibration is used to ensure that open loop dispense control (e.g., based on pressurized chamber pressure, valve open time, etc., and without feedback of actual dispensed amounts) results in desired dispensed quantities. Alternatively, in various embodiments, the system has closed loop amount/volume metering control.

In some embodiments, accurate dispensing of a predetermined amount of at least one ingredient from a plurality of ingredient reservoirs utilizes real time software control of one or more actuators and one or more pressure pumps based on inputs from one or more sensors located throughout the system. In various embodiments, the controller (e.g., one or more embedded control processors) is configured to: translate formula information (e.g., predefined beverage ingredients and amounts) into dispense control actions (e.g., control of valves and/or pumps) that are scheduled and/or sequenced; monitor what are the contents of a given ingredient, water, and/or alcohol reservoir (e.g., using RFID tags and/or barcodes on each of the reservoirs to identify a type of the reservoir and/or its contents); monitor remaining ingredient, water, and/or alcohol levels; and receive user input.

In some embodiments, the controller manages individual actuators and is configured to execute precise actuator timing to control flow time, and thus dispense a required amount (e.g., volume) of an ingredient. In some embodiments and/or usage scenarios, a typical formula for a predefined fluid mixture includes one to 300 different ingredients, each of which is able to be in the form of a liquid, a solid, or a gas. In some embodiments, the list of ingredients for a particular predefined fluid mixture includes dispense parameters such as a location of an ingredient reservoir containing a specific ingredient in the list of ingredients as well as a desired dispense amount (e.g., volume) of the specific ingredient. The system is configured to control and measure pressure in the pressurized chamber, orifice flow rates, and/or ingredient physical flow characteristics, and is configured to make appropriate computations to determine a valve timing needed to achieve a required dispense amount of the specific ingredient. In various embodiments, the system is configured to calculate a most efficient sequence for mixing solvents and/or ingredients in order to minimize mixing time.

In some embodiments, the controller is configured to manage individual actuators and regulate actuator timing to control flow time (e.g., how long a valve is open) and thus dispense required amounts of the respective ingredients from the ingredient reservoirs. In some embodiments, actuator health is monitored by the controller. For example, the temperature of an actuator motor winding is able to be inferred from measurement of actuator current. By monitoring actuator current, the controller is able to detect a valve that is not operating within defined performance limits. In some embodiments, the controller is configured to read a voltage drop across a 0.1 ohm shunt resistor in series with a solenoid coil of the actuator. A properly functioning solenoid has a well-characterized and repeatable waveform, having a characteristic solenoid coil inductive response. Measuring the actuator current provides a solenoid response waveform that is sampled with an A/D converter. A slope of this solenoid response waveform is monitored and is indicative of valve performance. In some embodiments, a cold baseline actuator current is measured at system startup. In various embodiments, the actuator health monitoring allows the system to recover from a sticking valve with an un-stick cycle.

In some embodiments, the controller produces pulse width modulated (PWM) signals that drive a low-side MOSFET transistor to activate the actuator. In various embodiments, PWM control allows the controller to drive the actuator solenoid coil hard to accelerate it initially, and then to reduce the duty cycle to a lower value to hold the solenoid in an open position, thereby saving power and reducing heat. In some embodiments, the power supply for the actuators is tightly regulated such that each actuator (if healthy) draws a reliable and repeatable current. For example, some recipes only require a few solenoids to actuate while others require 50 or more. The difference in power draw between these two examples is large enough that the power supply system design is important. In some embodiments, individual solenoid PWM control and direct solenoid current measurement (with minimal delay) are able to ensure control of actuator timing within a very small tolerance, such as within 1 millisecond. In some embodiments, such as some embodiments with PWM control of a particular actuator, the controller is programmed to maintain a plunger of the particular actuator in an intermediate position between the sealed position and the fully open position (e.g., partway open). In the intermediate position, a flow rate through a valve operated by the particular actuator is controllable to be less than a flow rate in the fully open position of the valve. In various embodiments, use of the intermediate position between the sealed position and the fully open position enables finer control of amounts of ingredients to be dispensed, and/or provides a method in addition to (or other than) duration of valve open time to control the amounts of ingredients to be dispensed.

In some embodiments, the system is configured to regulate the dispense pressure (e.g., the pressure of gas in the pressurized chamber) that expels the respective ingredients from the ingredient reservoirs when the respective valves are open. For example, few or many valves are required to be opened depending on the requested fluid mixture, and opening the valves changes an overall volume in the ingredient reservoirs as fluid is expelled. In some embodiments, the system includes a pressure sensor, a pressure regulator, a pressure accumulator, and/or a pressure pump, controlled/monitored by the controller, to regulate pressure in the pressurized chamber. In further embodiments, the controller is programmed to run a closed loop, real time, pressure monitoring routine to regulate the pressure in the pressurized chamber, and/or to determine amounts of the respective ingredients expelled from the ingredient reservoirs based on a change in the monitored pressure in the pressurized chamber. In some embodiments, a high-sensitivity pressure sensor is employed to monitor (with minimal delay) pressure inside the pressurized chamber, enabling firmware to compensate for pressure changes during dispense.

As stated above, in some embodiments, respective ingredients in the ingredient reservoirs include solid (e.g., powdered) ingredients, including solid ingredient mixtures (i.e., multiple solid ingredients such as a mixture of glucose powder and sucrose powder). In various embodiments, an ingredient reservoir containing a solid ingredient is a gravity dispense chamber. In some embodiments, a precise amount of a solid (e.g., powdered) ingredient is mechanically moved by an individual actuator to an exit orifice, and from there to a dissolution chamber. According to various embodiments, a single actuator (e.g., a solenoid or a voice coil) is used to dispense contents of multiple solid ingredient reservoirs, and/or a respective actuator is used to dispense contents of each solid ingredient reservoir.

In some embodiments, when an ingredient reservoir includes a syringe, plungers of the syringes are exposed to a controlled pressure in the pressurized chamber that provides a regulated force pushing on the plungers. In further embodiments, even with the plungers removed, ingredients in the syringes still receive force to expel the ingredients (e.g., into a mixing channel or a mixing chamber) when the respective valves for those ingredient reservoirs are opened. In some embodiments, an inert gas, such as argon, is used to protect ingredients from oxidation/degradation. In other embodiments, the controller is configured to displace (such as with a linear motor) at least one plunger of a syringe to flow a predetermined amount of the ingredient in the syringe to a mixing chamber. Such systems flow the predetermined amount of the ingredient in the syringe to the mixing chamber via injection distance of the plunger (hence volume dispense). This is a positive placement method instead of a time/pressure orifice method. In some embodiments of the time/pressure orifice method, the controller is configured to interpret readings from a pressure sensor and calculate the dispensed volume from each separate ingredient reservoir. A combination of these methods can be utilized together to form a more precise control of the dispensed volume. For example, in further embodiments, ingredient reservoirs with syringes are controlled with the positive placement method, and other ingredient reservoirs are controlled with the time/pressure orifice method.

In some embodiments, the ingredient reservoirs are loaded into or attached to the pressurized chamber with a controlled pressure for providing expulsion force.

In some embodiments, as described above, the chemical analysis of a fluid mixture provides a detailed list of ingredients that make up the fluid mixture. In various embodiments, the system includes at least about 5, at least about 10, at least about 20, at least about 30, at least about 40, or at least about 50 ingredient reservoirs. In some embodiments, a cartridge includes at least about 5, at least about 10, at least about 20, at least about 30, at least about 40, or at least about 50 ingredient reservoirs. In various embodiments, the system includes at most about 500, at most about 250, at most about 150, at most about 100, at most about 75, at most about 50, at most about 40, at most about 30, at most about 25, at most about 20, at most about 15, or at most about 10 ingredient reservoirs. In some embodiments, a cartridge includes at most about 500, at most about 250, at most about 150, at most about 100, at most about 75, at most about 50, at most about 40, at most about 30, at most about 25, at most about 20, at most about 15, or at most about 10 ingredient reservoirs. In various embodiments, any of the ingredients are a liquid, a solid, a gas, and/or a combination thereof. For example, the ingredients include an amount of an acid in liquid form, an amount of a sugar in powdered/granule form, and/or an amount of compressed nitrogen or $CO_2$ in gas form.

In some embodiments, because one or more of the ingredients required to create a particular fluid mixture are used in small amounts (e.g., less than 0.1 mL, less than 0.01 mL, less than 0.001 mL, or as small as 50 uL), a high level of repeatability and precision is required when dispensing ingredients to be combined with one or more solvents to form the particular fluid mixture. In some embodiments, a predetermined amount of at least one ingredient required to form the particular fluid mixture is at most 3 L, at most 2 L, at most 1 L, at most 500 mL, at most 250 mL, at most 100 mL, at most 50 mL, at most 25 mL, at most 10 mL, at most 5 mL, at most 1 mL, at most 0.5 mL, at most 0.1 mL, at most 0.01 mL, at most 0.001 mL, or at most 50 uL. Accordingly, in further embodiments, the respective valves of the ingredient reservoirs support precision over a wide range of dispense amounts, varying by as much as a factor of one hundred, a factor of one thousand, or more.

As illustrated in FIGS. 11 and 12, the system includes at least one heat exchanger. A heat exchanger is selectively able to adjust the temperature of a fluid in a chamber, a flow line (e.g., tubing or piping), a mixing channel, etc. either up (i.e., acting as heater) or down (i.e., acting as a chiller). For example, a certain beverage is supposed to be served at a specific temperature, or a user may select a desired temperature at which their beverage is to be dispensed. In various embodiments, a predetermined amount of one or more solvents (e.g., a predetermined amount of water from a water reservoir and/or a predetermined amount of alcohol from an alcohol reservoir) is cooled and/or heated by a heat exchanger prior to flowing to a mixing channel, a mixing chamber, and/or a dissolution chamber. In some embodiments, the temperature to which the one or more solvents are cooled and/or heated is according to a fluid mixture request received by the system (e.g., user selection of a beverage at 10° C., etc.).

In some embodiments, the system includes a first temperature sensor configured to measure a temperature of a solvent flowing from a solvent reservoir to at least one heat exchanger, a second temperature sensor configured to measure a temperature of a second solvent flowing from a second solvent reservoir to the at least one heat exchanger, and a third temperature sensor configured to measure a temperature of a solvent mixture (first and second solvent combined) from the at least one heat exchanger to a mixing channel, a mixing chamber, and/or a dissolution chamber. For example, in various embodiments, the system includes a first temperature sensor configured to measure a temperature of water flowing from a water reservoir to the at least one heat exchanger, a second temperature sensor configured to measure a temperature of alcohol flowing from an alcohol reservoir to the at least one heat exchanger, and a third temperature sensor configured to measure a temperature of the water/alcohol mixture from the at least one heat exchanger to a mixing channel. In some embodiments, the system adjusts the temperature of the at least one heat exchanger based on the temperature sensor measurements such that an intermediate fluid mixture sent to the final mixing chamber meets requested temperature requirements.

In some embodiments, the system includes a plurality of heat exchangers, such as those illustrated in FIGS. 11 and 12, at various points throughout the system. In some embodiments, a predetermined amount of solvent from a solvent reservoir is optionally and/or selectively cooled and/or heated by a first heat exchanger prior to flowing to a mixing channel, and a predetermined amount of a second solvent from a second solvent reservoir is optionally and/or selectively cooled and/or heated by a second heat exchanger prior to flowing to the mixing channel. For example, a predetermined amount of water from the water reservoir is cooled/heated by a first heat exchanger prior to flowing to a mixing channel, and a predetermined amount of alcohol from an alcohol reservoir is cooled/heated by a second heat exchanger prior to flowing to the mixing channel.

In some embodiments, the system includes a heat exchanger such that any fluid mixture formed in a mixing chamber (such as the final mixing chamber) is optionally and/or selectively cooled and/or heated by the heat exchanger. This helps ensure that the fluid mixture dispensed meets a temperature requirement received in a fluid mixture request. In some embodiments, a mixing channel includes (or is attached to) a heat exchanger to heat an intermediate fluid mixture formed in the mixing channel. In some embodiments, a dissolution chamber includes (or is attached to) a heat exchanger to help dissolution of an ingredient in one or more solvents. In some embodiments, one or more ingredient reservoirs and/or an ingredient cartridge include (or are attached to) a heat exchanger to control the temperature of the one or more ingredient reservoirs and/or the ingredient cartridge.

In some embodiments, the system includes at least one heat exchanger such that a predetermined amount of at least one solvent from at least one solvent reservoir is optionally and/or selectively cooled and/or heated by the at least one heat exchanger prior to flowing to a dissolution chamber to help with dissolution of a predetermined amount of at least one ingredient. In some embodiments, the dissolution chamber itself is optionally and/or selectively heated and/or cooled by the heat exchanger to help with the dissolution of the predetermined amount of the at least one ingredient.

In some embodiments, the system includes a dispenser (e.g., a nozzle) that is fluidly connected to the final mixing chamber. At block 106 of FIG. 1, in some embodiments, the system is configured to dispense the fluid mixture (e.g., the beverage) via the dispenser after the fluid mixture is formed in the final mixing chamber. In some embodiments, the dispenser is used to make a solid (e.g., to extrude the fluid mixture) and controls are added to make 3D structures, such as via 3D printing. In some embodiments, the final beverage has a volume of at most 3 L, at most 2 L, at most 1 L, at most 750 mL, at most 500 mL, at most 250 mL, at most 200 mL, at most 150 mL, at most 100 mL, at most 50 mL, at most 25 mL, at most 10 mL, at most 5 mL, or at most 1 mL.

In some embodiments, the system includes a fluid mixture holder sensor, and the controller is programmed to dispense the fluid mixture only when a fluid mixture holder is detected by the fluid mixture holder sensor. In some embodiments, the system includes a fluid mixture holder sensor, and the controller is programmed to start the mixing process only when a fluid mixture holder is detected by the fluid mixture holder sensor. FIGS. 2A, 2B, 11 and 12 illustrate fluid mixture holder 4 (e.g., a dispensed mixture container, such as a wine glass, teacup, shot glass, etc.). In some embodiments, the system includes a drip tray sensor, and the controller is programmed to determine whether a drip tray is present and/or an amount of fluid in the drip tray. In some embodiments, the system includes a dispensing sensor, and the dispensing sensor is configured to determine whether a dispensing profile of the fluid mixture dispensing is satisfactory.

In some embodiments, the systems disclosed herein dispense air at various points throughout the system, for example at air nodes as illustrated in FIG. 12. For example, in some embodiments, air is utilized to maintain pressure in the pressurized chamber. In various embodiments, air is used as a purge for a flow line, a mixing chamber, a dissolution chamber, and/or a mixing channel so that there is no leftover solvent or solvent mixture prior to starting a next fluid mixture. In some embodiments, air is used to help dispense solvent and/or an ingredient from an ingredient reservoir. In various embodiments, air is used to control a pneumatic valve to control flow or to help eject a cartridge.

Although the method in FIG. 1 (or in FIG. 13) is only with respect to a single fluid mixture (e.g., a beverage), in some embodiments the system is able to receive a request for a second fluid mixture and, in response to receiving the request for the second fluid mixture, repeat and/or modify the operations of FIG. 1 (or the operations of FIG. 13) to dispense the second fluid mixture. The second fluid mixture can be the same as or can be different from the first fluid mixture. For example, a predetermined amount of at least one solvent and/or of at least one ingredient is different for the second fluid mixture as compared to the first fluid mixture. Accordingly, predetermined amounts of one or more solvents and of one or more ingredients from the plurality of ingredient reservoirs can all be different for the second fluid mixture as compared to the first fluid mixture. Further, the second fluid mixture may use one or more solvents and/or one or more ingredients that were not used in the first fluid mixture, and/or the second fluid mixture may not use one or more solvents and/or one or more ingredients that were used in the first fluid mixture.

In some embodiments, the systems disclosed herein are able to make many different combinations of fluid mixtures based on respective requests. Once a request is received for a fluid mixture, the system automatically creates and dispenses the requested fluid mixture by flowing the proper amounts of one or more solvents and/or one or more ingredients from their respective reservoirs to the final mixing chamber and then dispensing via the dispenser.

FIG. 9 illustrates a computer in accordance with some embodiments. In some embodiments, computer 1200 is a component of a system for dispensing fluid mixtures, such as the controller (which may comprise a plurality of sub-controllers). In various embodiments, the system for dispensing fluid mixtures includes more than one computer 1200 as described above. In some embodiments, computer 1200 is configured to execute a method for dispensing a fluid mixture, such as all or part of method 100 described above with respect to FIG. 1, method 1600 described below with respect to FIG. 16, or any other method disclosed herein.

In some embodiments, computer 1200 is a host computer connected to a network. According to various embodiments, computer 1200 is a client computer or a server. As illustrated in FIG. 9, computer 1200 is any suitable type of processor-based (e.g., microprocessor-based) device, such as a personal computer, a workstation, a server, or a handheld computing device (such as a phone or a tablet). In some embodiments, the computer includes, for example, one or more of processor 1210, input device 1220, output device 1230, storage 1240, and communication device 1260.

In some embodiments, input device 1220 is any suitable device that provides input, such as a touch screen or touch pad, a keyboard, a mouse, or a voice-recognition device. Other possible input devices include an accelerometer or a microphone for monitoring system health. In some embodiments, output device 1230 is any suitable device that provides output, such as a touch screen, a monitor, a printer, a disk drive, or a speaker.

In some embodiments, storage 1240 is any suitable device that provides storage, such as an electrical, magnetic, or optical memory, including a RAM, cache, hard drive, CD-ROM drive, tape drive, or removable storage disk. In some embodiments, communication device 1260 includes any suitable device capable of transmitting and receiving signals over a network, such as a network interface chip or card. In various embodiments, the components of the computer are connected in any suitable manner, such as via a physical bus or wirelessly. In some embodiments, storage 1240 is a non-transitory computer-readable storage medium comprising one or more programs, which, when executed by one or more processors, such as processor 1210, cause the one or more processors to execute methods described herein, such as all or part of method 100 described above with respect to FIG. 1, all or part of method 1600 described below with respect to FIG. 13, and any other method described herein.

In some embodiments, software 1250, which is optionally and/or selectively stored in storage 1240 and executed by processor 1210, includes, for example, programming that embodies the functionality of the present disclosure (e.g., as embodied in the systems, computers, servers, and/or devices as described above). In some embodiments, software 1250 is implemented on and/or executed on a combination of servers such as application servers and database servers.

In some embodiments, software 1250 is able to be stored and/or transported within any computer-readable storage medium for use by or in connection with an instruction execution system, apparatus, or device, such as those described above (e.g., processor 1210), that can fetch and execute instructions associated with the software from the instruction execution system, apparatus, or device. In the context of this disclosure, a computer-readable storage medium can be any medium, such as storage 1240, that can contain or store programming for use by or in connection with an instruction execution system, apparatus, or device.

In some embodiments, software 1250 is able to be propagated within any transport medium for use by or in connection with an instruction execution system, apparatus, or device, such as those described above, that can fetch and execute instructions associated with the software from the instruction execution system, apparatus, or device. In the context of this disclosure, a transport medium can be any medium that can communicate, propagate, or transport programming for use by or in connection with an instruction execution system, apparatus, or device. The transport medium can include, but is not limited to, an electronic, magnetic, optical, electromagnetic, or infrared wired or wireless propagation medium.

In some embodiments, computer 1200 is connected to a network, which can be any suitable type of interconnected communication system. The network can implement any suitable communications protocol and can be secured by any suitable security protocol. In some embodiments, the network comprises network links of any suitable arrangement that implement the transmission and reception of network signals, such as wireless network connections, T1 or T3 lines, cable networks, DSL, or telephone lines.

In some embodiments, computer 1200 is able to implement any operating system suitable for operating on the network. In some embodiments, software 1250 is written in any suitable programming language, such as C, C++, Java, or Python. In various embodiments, application software embodying the functionality of the present disclosure is deployed in different configurations, such as in a client/server arrangement or through a Web browser as a Web-based application or Web service, for example.

FIG. 13 illustrates a flowchart representing an exemplary method 1600 of preparing and dispensing a fluid mixture. Method 1600 begins (start 1610) with a request to dispense a selected fluid mixture (e.g., a beverage). A controller of the system determines, from the recipe for the selected fluid mixture, a sequence of operations of the system (e.g., control of pumps, valves, etc.) to prepare and dispense the fluid mixture. The operations in FIG. 13 illustrate an example of the sequence of operations to prepare and dispense the fluid mixture. The order of operations illustrated in FIG. 13 is merely one example, and other sequences of operations (e.g., changing an order of the illustrated operations and/or adding other operations or removing one or more of the illustrated operations) are optionally and/or selectively used in various embodiments and/or usage scenarios. Further, a size and/or an orientation of the boxes in FIG. 13 should not be considered significant.

Cartridge Actions 1620 in FIG. 13 indicates a subset of the operations that are related to the ingredient cartridge. In operation 1622, a first amount of fluid (e.g., a solvent from a solvent reservoir, and/or a mixture of two or more solvents from two or more solvent reservoirs) flows (e.g., is pumped) from the fluid inlet through the one or more channels of the ingredient cartridge, such as to "pre-wet" the one or more channels so that respective ingredients dispensed from the ingredient reservoirs are not dispensed into a "dry" channel. In some embodiments and/or usage scenarios, the fluid outlet is open (e.g., without a valve, or with an open valve), and at least some of the first amount of fluid is retained in the one or more channels due to effective backpressure into the one or more channels from air in the fluid path fed by the fluid outlet. In operation 1624, one or more of the respective ingredients from the ingredient reservoirs are dispensed into the one or more channels (mixing with any remaining amount of the first amount of fluid), and possibly flowing, at least in part, to the fluid outlet as part of an intermediate fluid mixture. In operation 1626, a second amount of fluid (e.g., solvent) flows from the fluid inlet through the one or more channels of the ingredient cartridge to the fluid outlet. In operation 1628, the second amount of fluid mixes with the dispensed ingredients and flows through the fluid outlet as (more of) the intermediate fluid mixture. The intermediate fluid mixture flows to a mixing chamber (see operation 1640). In various embodiments, the volume of the fluid and/or the force with which the fluid flows (e.g., is pumped) overcomes any backpressure at the fluid outlet. In some embodiments, not illustrated in FIG. 13, as part of and/or after operation 1628, air is forced through the fluid inlet to flush any remaining amount of the fluid and/or the dispensed ingredients to the fluid outlet. In some embodiments, the flow of the first amount of fluid in operation 1622 ends prior to a start of the dispensing of the ingredients in operation 1624, and the flow of the second amount of fluid in operation 1626 starts after an end of the dispensing of the ingredients in operation 1624. In other embodiments, the flow of the first amount of fluid in operation 1622 and/or the flow of the second amount of fluid in operation 1626 overlaps with the dispensing of the ingredients in operation 1624. In further embodiments, the flow of the first amount of fluid in operation 1622 and the flow of the second amount of fluid in operation 1626 are one continuous flow of fluid, and the dispensing of the ingredients in operation 1624 occurs during the one continuous flow.

In some embodiments, the mixing chamber in operation 1640 is a final mixing chamber, and in other embodiments, the mixing chamber is prior to a final mixing chamber. In operation 1630, one or more other fluids (e.g., respective solvents from one or more solvent reservoirs) are dispensed directly to the mixing chamber. According to various embodiments, operation 1630 occurs one or more of: prior to cartridge actions 1620; during at least some of cartridge actions 1620; after cartridge actions 1620; and any combination of the foregoing (e.g., the one or more other fluids are dispensed other than in a continuous flow). In operation 1640, the intermediate fluid mixture and the one or more other fluids mix in the mixing chamber and then flow to either a final mixing chamber (operation 1680), if there is a final mixing chamber, or directly to a dispenser (operation 1690).

In operation 1670, if there is a separate final mixing chamber (separate from the mixing chamber in operation 1640), at least one other fluid (e.g., respective solvents from one or more solvent reservoirs) is dispensed directly to the final mixing chamber where, in operation 1680, the at least one other fluid is mixed with a fluid flow from the prior mixing chamber (operation 1640).

In operation 1690, a resulting fluid mixture (either from operation 1640 if there is no final mixing chamber, or from operation 1680 if there is a final mixing chamber) is dispensed, such as through a dispenser (e.g., a nozzle).

Unless defined otherwise, all terms of art, notations and other technical and scientific terms or terminology used herein are intended to have the same meaning as is commonly understood by one of ordinary skill in the art to which the claimed subject matter pertains. In some cases, terms with commonly understood meanings are defined herein for clarity and/or for ready reference, and the inclusion of such definitions herein should not necessarily be construed to represent a substantial difference over what is generally understood in the art.

Reference to "about" a value or parameter herein includes (and describes) variations that are directed to that value or parameter per se. For example, description referring to "about X" includes description of "X". In addition, reference to phrases "less than", "greater than", "at most", "at least", "less than or equal to", "greater than or equal to", or other similar phrases followed by a string of values or parameters is meant to apply the phrase to each value or parameter in the string of values or parameters.

As used herein, the singular forms "a," "an," and "the" are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Certain aspects of the present disclosure include process steps, method operations, and instructions described herein in the form of an algorithm. It should be noted that the process steps, method operations, and instructions of the present disclosure could be embodied in software, firmware, or hardware and, when embodied in software, could be downloaded to reside on and be operated from different platforms used by a variety of operating systems. Unless specifically stated otherwise as apparent from the following, it is appreciated that, throughout the description, descriptions utilizing terms such as "processing," "computing," "calculating," "determining," "displaying," "generating" or the like, refer to the action and processes of a computer system, or similar electronic computing device, that manipulates and transforms data represented as physical (electronic) quantities within the computer system memories or registers or other such information storage, transmission, or display devices.

The present disclosure in some embodiments also relates to a device for performing the operations herein. This device may be specially constructed for the required purposes, or it may comprise a general-purpose computer selectively activated or reconfigured by a computer program stored in the computer. Such a computer program may be stored in a non-transitory, computer readable storage medium, such as, but not limited to, any type of disk, including floppy disks, USB flash drives, external hard drives, optical disks, CD-ROMS, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each connected to a computer system bus. Furthermore, the computing systems referred to in the specification may include a single processor, may be architectures employing multiple processor designs, such as for performing different functions or for increased computing capability. Suitable processors include central processing units (CPUs), graphical processing units (GPUs), field programmable gate arrays (FPGAs), and ASICs.

The methods, devices, and systems described herein are not inherently related to any particular computer or other apparatus. Various general-purpose systems may also be used with programs in accordance with the teachings herein, or it may prove convenient to construct a more specialized apparatus to perform the required method operations. The structure for a variety of these systems can appear from the description above. In addition, the present disclosure is not described with reference to any particular programming language. It will be appreciated that a variety of programming languages may be used to implement the teachings of the present invention as described herein.

This application discloses several numerical ranges in the text and figures. The numerical ranges disclosed inherently support any range or value within the disclosed numerical ranges, including the endpoints, even though a precise range limitation is not stated verbatim in the specification because this disclosure can be practiced throughout the disclosed numerical ranges.

The above description is presented to enable a person skilled in the art to make and use the disclosure, and is provided in the context of a particular application and its requirements. Various modifications to the preferred embodiments will be readily apparent to those skilled in the art, and the generic principles defined herein may be applied to other embodiments and applications without departing from the spirit and scope of the disclosure. Thus, this disclosure is not intended to be limited to the embodiments illustrated, but is to be accorded the widest scope consistent with the principles and features disclosed herein.

What is claimed is:

1. A fluid mixture dispensing system comprising:
   at least two solvent reservoirs containing respective solvents;
   a plurality of ingredient reservoirs;
   two or more mixing channels fluidly connected to the at least two solvent reservoirs and each fluidly connected to at least one of the plurality of ingredient reservoirs;
   a mixing chamber fluidly connected to the two or more mixing channels;
   a dispenser fluidly connected to the mixing chamber; and
   a controller, wherein the controller is programmed to:
      receive a request for a fluid mixture; and
      in response to receiving the request for the fluid mixture:
         flow a predetermined amount of at least two of the respective solvents from the at least two solvent reservoirs and a predetermined amount of at least one ingredient from the plurality of ingredient reservoirs to the two or more mixing channels to form an intermediate fluid mixture;
         flow the intermediate fluid mixture to the mixing chamber to form the fluid mixture;
         flow a second predetermined amount of one of the respective solvents from the at least two solvent reservoirs to the mixing chamber to form the fluid mixture; and
         dispense the fluid mixture from the mixing chamber via the dispenser.

2. The fluid mixture dispensing system of claim 1, wherein the predetermined amount of the at least two of the respective solvents from the at least two solvent reservoirs is combined in a fluid path between the at least two solvent reservoirs and the two or more mixing channels.

3. The fluid mixture dispensing system of claim 2, wherein each of the two or more mixing channels is fluidly connected to a respective one or more of the plurality of ingredient reservoirs;
wherein each of the plurality of ingredient reservoirs is configured to dispense into a respective one of the two or more mixing channels; and
wherein two or more of the plurality of ingredient reservoirs are configured to dispense into a particular one of the two or more mixing channels.

4. The fluid mixture dispensing system of claim 3, wherein a width of the particular mixing channel is such that at least some of the predetermined amount of the at least two of the respective solvents is able to flow through the particular mixing channel around a non-dispensing one of the two or more of the plurality of ingredient reservoirs.

5. The fluid mixture dispensing system of claim 1, wherein the flow of the predetermined amount of the at least two of the respective solvents from the at least two solvent reservoirs comprises:
   an initial flow of some of the predetermined amount of the at least two of the respective solvents;
   a pause in a flow of the at least two of the respective solvents during the flow of the predetermined amount of the at least one ingredient from the plurality of ingredient reservoirs; and
   a final flow of a remainder of the predetermined amount of the at least two of the respective solvents.

6. The fluid mixture dispensing system of claim 5, wherein the pause in the flow of the at least two of the respective solvents begins before and ends after the flow of the predetermined amount of the at least one ingredient from the plurality of ingredient reservoirs.

7. The fluid mixture dispensing system of claim 5, wherein the pause in the flow of the at least two of the respective solvents is not as long as a duration of the flow of the predetermined amount of the at least one ingredient from the plurality of ingredient reservoirs.

8. The fluid mixture dispensing system of claim 1, wherein the fluid mixture in the mixing chamber is heated or cooled by a heat exchanger.

9. The fluid mixture dispensing system of claim 1, wherein the one of the respective solvents from the at least two solvent reservoirs comprises alcohol.

10. The fluid mixture dispensing system of claim 1, further comprising an ingredient cartridge; and
wherein the ingredient cartridge comprises a pressurized chamber, the pressurized chamber containing the plurality of ingredient reservoirs.

11. The fluid mixture dispensing system of claim 10, wherein the controller is further programmed to control pressure of the pressurized chamber so that pressure is applied to the plurality of ingredient reservoirs; and
wherein the controller is programmed to flow the predetermined amount of the at least one ingredient from the plurality of ingredient reservoirs by controlling the pressure applied to the plurality of ingredient reservoirs.

12. The fluid mixture dispensing system of claim 11, wherein the predetermined amount of the at least one ingredient from the plurality of ingredient reservoirs is dispensed via at least one valve into the two or more mixing channels.

13. The fluid mixture dispensing system of claim 12, wherein the controller is programmed to flow the predetermined amount of the at least one ingredient from the plurality of ingredient reservoirs by opening the at least one valve for a time period based on at least the pressure applied to the plurality of ingredient reservoirs.

14. The fluid mixture dispensing system of claim 1, wherein the controller is programmed to flow the predetermined amount of the at least two of the respective solvents from the at least two solvent reservoirs and the predetermined amount of the at least one ingredient from the plurality of ingredient reservoirs to the two or more mixing channels according to a formula for the fluid mixture.

15. A method used in a fluid mixture dispensing system having (a) at least two solvent reservoirs containing respective solvents; (b) a plurality of ingredient reservoirs; and (c) two or more mixing channels fluidly connected to the at least two solvent reservoirs and each fluidly connected to at least one of the plurality of ingredient reservoirs, the method comprising:
receiving a request for a fluid mixture; and
in response to receiving the request for the fluid mixture,
(a) flowing a predetermined amount of at least two of the respective solvents from the at least two solvent reservoirs and a predetermined amount of at least one ingredient from the plurality of ingredient reservoirs to the two or more mixing channels to form an intermediate fluid mixture;
(b) flowing the intermediate fluid mixture to a mixing chamber to form the fluid mixture;
(c) flowing a second predetermined amount of one of the respective solvents from the at least two solvent reservoirs to the mixing chamber to form the fluid mixture; and
(d) dispensing the fluid mixture from the mixing chamber via a dispenser.

16. The method of claim 15, further comprising, in response to receiving the request for the fluid mixture, combining, in a fluid path between the at least two solvent reservoirs and the two or more mixing channels, the predetermined amount of the at least two of the respective solvents from the at least two solvent reservoirs.

17. The method of claim 15, wherein the flowing the predetermined amount of the at least two of the respective solvents from the at least two solvent reservoirs comprises:
(i) initially flowing some of the predetermined amount of the at least two of the respective solvents;
(ii) pausing a flow of the at least two of the respective solvents during the flowing of the predetermined amount of the at least one ingredient from the plurality of ingredient reservoirs; and
(iii) finally flowing a remainder of the predetermined amount of the at least two of the respective solvents.

18. The method of claim 17, further comprising, in response to receiving the request for the fluid mixture, sequencing, by a controller of the fluid mixture dispensing system, the initially flowing, the pausing, and the finally flowing with respect to the flowing of the predetermined amount of the at least one ingredient from the plurality of ingredient reservoirs.

19. The method of claim 15, further comprising, in response to receiving the request for the fluid mixture, controlling, by a controller of the fluid mixture dispensing system, one or more fluid moving mechanisms to flow the predetermined amount of the at least two of the respective solvents from the at least two solvent reservoirs and the predetermined amount of the at least one ingredient from the plurality of ingredient reservoirs to the two or more mixing channels.

20. The method of claim 19, wherein the one or more fluid moving mechanisms comprise a plurality of electromechanical valves, each of the plurality of electromechanical valves respective to one of the plurality of ingredient reservoirs.

21. The method of claim 15, wherein the one of the respective solvents from the at least two solvent reservoirs comprises alcohol.

22. A fluid mixture dispensing system comprising:
a plurality of solvent reservoirs, each containing a respective solvent;
a plurality of ingredient reservoirs, each containing a respective ingredient;
two or more mixing channels, each of the two or more mixing channels fluidly connected to (a) a particular two or more of the plurality of solvent reservoirs, and (b) a respective one or more of the plurality of ingredient reservoirs, wherein each of the plurality of ingredient reservoirs is configured to dispense into a respective one of the two or more mixing channels;
a mixing chamber fluidly connected to the two or more mixing channels;
a dispenser fluidly connected to the mixing chamber; and
a controller, wherein the controller is programmed to:
receive a request for a fluid mixture; and
in response to receiving the request for the fluid mixture, control operations of the fluid mixture dispensing system to produce the requested fluid mixture by:
mixing, in the two or more mixing channels to form an intermediate fluid mixture, (i) a respective predetermined amount of the respective solvents from each of the particular solvent reservoirs, and (ii) a respective predetermined amount of the respective ingredients from each of one or more of the plurality of ingredient reservoirs;
flowing, to the mixing chamber, the intermediate fluid mixture, wherein the fluid mixture comprises the intermediate fluid mixture;

flowing a second predetermined amount of at least one of the respective solvents from the plurality of solvent reservoirs to the mixing chamber; and
dispensing the fluid mixture via the dispenser.

23. The fluid mixture dispensing system of claim 22, wherein the plurality of ingredient reservoirs is stored in at least one cartridge; and wherein the at least one cartridge is configured to dispense the respective predetermined amount of the respective ingredients from each of the one or more of the plurality of ingredient reservoirs into the two or more mixing channels.

24. The fluid mixture dispensing system of claim 23, further comprising a plurality of electromechanical valves, each of the plurality of ingredient reservoirs respective to one of the plurality of electromechanical valves; and
wherein the respective predetermined amount of the respective ingredients from each of the one or more of the plurality of ingredient reservoirs is dispensed into the two or more mixing channels via the respective electromechanical valve.

25. The fluid mixture dispensing system of claim 24, wherein the at least one cartridge comprises a pressurized chamber, the pressurized chamber containing the plurality of ingredient reservoirs; and wherein the controller is further programmed to control pressure of the pressurized chamber.

26. The fluid mixture dispensing system of claim 25, wherein the controller is further programmed to control the dispensing of the respective predetermined amount of the respective ingredients from each of the one or more of the plurality of ingredient reservoirs by opening the respective electromechanical valve for a time period based on at least the pressure of the pressurized chamber.

27. The fluid mixture dispensing system of claim 23, wherein the respective predetermined amount of the respective solvents from each of the particular solvent reservoirs are combined in a fluid path between the particular solvent reservoirs and the two or more mixing channels.

28. A fluid mixture dispensing system comprising:
at least two solvent reservoirs containing respective solvents;
a plurality of ingredient reservoirs;
two or more mixing channels fluidly connected to the at least two solvent reservoirs and each fluidly connected to at least one of the plurality of ingredient reservoirs;
a mixing chamber fluidly connected to the two or more mixing channels;
a dispenser fluidly connected to the mixing chamber; and
a controller, wherein the controller is programmed to:
receive a request for a fluid mixture; and
in response to receiving the request for the fluid mixture:
flow a predetermined amount of at least two of the respective solvents from the at least two solvent reservoirs and a predetermined amount of at least one ingredient from the plurality of ingredient reservoirs to the two or more mixing channels to form an intermediate fluid mixture;
flow the intermediate fluid mixture to the mixing chamber to form the fluid mixture; and
dispense the fluid mixture from the mixing chamber via the dispenser;
wherein the predetermined amount of the at least two of the respective solvents from the at least two solvent reservoirs is combined in a fluid path between the at least two solvent reservoirs and the two or more mixing channels.

29. A fluid mixture dispensing system comprising:
at least two solvent reservoirs containing respective solvents;
a plurality of ingredient reservoirs;
two or more mixing channels fluidly connected to the at least two solvent reservoirs and each fluidly connected to at least one of the plurality of ingredient reservoirs;
a mixing chamber fluidly connected to the two or more mixing channels;
a dispenser fluidly connected to the mixing chamber; and
a controller, wherein the controller is programmed to:
receive a request for a fluid mixture; and
in response to receiving the request for the fluid mixture:
flow a predetermined amount of at least two of the respective solvents from the at least two solvent reservoirs and a predetermined amount of at least one ingredient from the plurality of ingredient reservoirs to the two or more mixing channels to form an intermediate fluid mixture;
flow the intermediate fluid mixture to the mixing chamber to form the fluid mixture; and
dispense the fluid mixture from the mixing chamber via the dispenser;
wherein the flow of the predetermined amount of the at least two of the respective solvents from the at least two solvent reservoirs comprises:
an initial flow of some of the predetermined amount of the at least two of the respective solvents;
a pause in a flow of the at least two of the respective solvents during the flow of the predetermined amount of the at least one ingredient from the plurality of ingredient reservoirs; and
a final flow of a remainder of the predetermined amount of the at least two of the respective solvents.

30. A method used in a fluid mixture dispensing system having (a) at least two solvent reservoirs containing respective solvents; (b) a plurality of ingredient reservoirs; and (c) two or more mixing channels fluidly connected to the at least two solvent reservoirs and each fluidly connected to at least one of the plurality of ingredient reservoirs, the method comprising:
receiving a request for a fluid mixture; and
in response to receiving the request for the fluid mixture,
(a) flowing a predetermined amount of at least two of the respective solvents from the at least two solvent reservoirs and a predetermined amount of at least one ingredient from the plurality of ingredient reservoirs to the two or more mixing channels to form an intermediate fluid mixture;
(b) combining, in a fluid path between the at least two solvent reservoirs and the two or more mixing channels, the predetermined amount of the at least two of the respective solvents from the at least two solvent reservoirs;
(c) flowing the intermediate fluid mixture to a mixing chamber to form the fluid mixture; and
(d) dispensing the fluid mixture from the mixing chamber via a dispenser.

31. The fluid mixture dispensing system of claim 28, wherein the controller is further programmed to flow a second predetermined amount of one of the respective solvents from the at least two solvent reservoirs to the mixing chamber to form the fluid mixture.

32. A method used in a fluid mixture dispensing system having (a) at least two solvent reservoirs containing respective solvents; (b) a plurality of ingredient reservoirs; and (c) two or more mixing channels fluidly connected to the at least two solvent reservoirs and each fluidly connected to at least one of the plurality of ingredient reservoirs, the method comprising:

receiving a request for a fluid mixture; and
in response to receiving the request for the fluid mixture,
(a) flowing a predetermined amount of at least two of the respective solvents from the at least two solvent reservoirs and a predetermined amount of at least one ingredient from the plurality of ingredient reservoirs to the two or more mixing channels to form an intermediate fluid mixture;
(b) flowing the intermediate fluid mixture to a mixing chamber to form the fluid mixture; and
(c) dispensing the fluid mixture from the mixing chamber via a dispenser;
wherein the flowing the predetermined amount of the at least two of the respective solvents from the at least two solvent reservoirs comprises:
(i) initially flowing some of the predetermined amount of the at least two of the respective solvents;
(ii) pausing a flow of the at least two of the respective solvents during the flowing of the predetermined amount of the at least one ingredient from the plurality of ingredient reservoirs; and
(iii) finally flowing a remainder of the predetermined amount of the at least two of the respective solvents.

33. The method of claim 32,
further comprising, in response to receiving the request for the fluid mixture, flowing a second predetermined amount of one of the respective solvents from the at least two solvent reservoirs to the mixing chamber to form the fluid mixture.

34. A fluid mixture dispensing system comprising:
a plurality of solvent reservoirs, each containing a respective solvent;
a plurality of ingredient reservoirs, each containing a respective ingredient;
two or more mixing channels, each of the two or more mixing channels fluidly connected to (a) a particular two or more of the plurality of solvent reservoirs, and (b) a respective one or more of the plurality of ingredient reservoirs, wherein each of the plurality of ingredient reservoirs is configured to dispense into a respective one of the two or more mixing channels;
a mixing chamber fluidly connected to the two or more mixing channels;
a dispenser fluidly connected to the mixing chamber; and
a controller, wherein the controller is programmed to:
receive a request for a fluid mixture; and
in response to receiving the request for the fluid mixture, control operations of the fluid mixture dispensing system to produce the requested fluid mixture by:
mixing, in the two or more mixing channels to form an intermediate fluid mixture, (i) a respective predetermined amount of the respective solvents from each of the particular solvent reservoirs, and (ii) a respective predetermined amount of the respective ingredients from each of one or more of the plurality of ingredient reservoirs;
flowing, to the mixing chamber and then to the dispenser, the intermediate fluid mixture, wherein the fluid mixture comprises the intermediate fluid mixture; and
dispensing the fluid mixture via the dispenser;
wherein the respective predetermined amount of the respective solvents from each of the particular solvent reservoirs are combined in a fluid path between the particular solvent reservoirs and the two or more mixing channels.

35. A fluid mixture dispensing system comprising:
a plurality of solvent reservoirs, each containing a respective solvent;
a plurality of ingredient reservoirs, each containing a respective ingredient;
two or more mixing channels, each of the two or more mixing channels fluidly connected to (a) a particular two or more of the plurality of solvent reservoirs, and (b) a respective one or more of the plurality of ingredient reservoirs, wherein each of the plurality of ingredient reservoirs is configured to dispense into a respective one of the two or more mixing channels;
a mixing chamber fluidly connected to the two or more mixing channels;
a dispenser fluidly connected to the mixing chamber; and
a controller, wherein the controller is programmed to:
receive a request for a fluid mixture; and
in response to receiving the request for the fluid mixture, control operations of the fluid mixture dispensing system to produce the requested fluid mixture by:
mixing, in the two or more mixing channels to form an intermediate fluid mixture, (i) a respective predetermined amount of the respective solvents from each of the particular solvent reservoirs, and (ii) a respective predetermined amount of the respective ingredients from each of one or more of the plurality of ingredient reservoirs;
flowing, to the mixing chamber and then to the dispenser, the intermediate fluid mixture, wherein the fluid mixture comprises the intermediate fluid mixture; and
dispensing the fluid mixture via the dispenser;
wherein the respective predetermined amount of the respective solvents is provided in a flow, and wherein the flow comprises:
an initial flow of some of the predetermined amount of the respective solvents;
a pause in the flow of the respective solvents to receive the predetermined amount of the respective ingredients; and
a final flow of a remainder of the predetermined amount of the respective solvents.

36. The fluid mixture dispensing system of claim 35, wherein the controller is further programmed, in response to receiving the request for the fluid mixture, to control operations of the fluid mixture dispensing system to produce the requested fluid mixture by flowing a second predetermined amount of at least one of the respective solvents from the plurality of solvent reservoirs to the mixing chamber.

* * * * *